US011553278B2

(12) United States Patent
Kim

(10) Patent No.: US 11,553,278 B2
(45) Date of Patent: Jan. 10, 2023

(54) DISPLAY APPARATUS

(71) Applicant: LG Display Co., Ltd., Seoul (KR)

(72) Inventor: SeYoung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 42 days.

(21) Appl. No.: 17/343,721

(22) Filed: Jun. 9, 2021

(65) Prior Publication Data

US 2021/0306753 A1    Sep. 30, 2021

Related U.S. Application Data

(62) Division of application No. 16/531,716, filed on Aug. 5, 2019, now Pat. No. 11,057,707.

(30) Foreign Application Priority Data

Aug. 29, 2018   (KR) .................. 10-2018-0102079

(51) Int. Cl.
*H04R 7/04* (2006.01)
*H04R 9/02* (2006.01)
(Continued)

(52) U.S. Cl.
CPC ............. *H04R 7/045* (2013.01); *H04R 1/288* (2013.01); *H04R 9/025* (2013.01); *H04R 9/045* (2013.01);
(Continued)

(58) Field of Classification Search
CPC .......... H04R 1/02; H04R 1/025; H04R 1/028; H04R 2201/00; H04R 2201/02;
(Continued)

(56) References Cited

U.S. PATENT DOCUMENTS 6,751,333 B1   6/2004 Azima et al.
6,760,460 B1   7/2004 Jeon
(Continued)

FOREIGN PATENT DOCUMENTS

CN        1271243 A     10/2000
CN      201623850 U     11/2010
(Continued)

OTHER PUBLICATIONS

Office Action dated Sep. 9, 2021, issued in corresponding Chinese Patent Application No. 201910730076.2.
(Continued)

*Primary Examiner* — Walter F Briney, III
(74) *Attorney, Agent, or Firm* — Morgan, Lewis & Bockius LLP

(57) ABSTRACT

A display apparatus includes: a display panel configured to display an image; a housing module including a roller configured to have the display panel wound or unwound in the housing module; a rolling module including a structure connected to an upper portion of the display panel, and configured to wind or unwind the display panel according to a folding or unfolding of the structure; a plurality of beams on one surface of display panel that extends in a first direction, and arranged in a second direction vertical to the first direction; and a vibration generating device in a portion of each of the plurality of beams, wherein the vibration generating device includes a plurality of sound generating modules configured to vibrate the display panel when the display panel is unwound from the roller and the structure is unfolded.

18 Claims, 16 Drawing Sheets

(51) Int. Cl.
*H04R 1/28* (2006.01)
*H04R 9/04* (2006.01)
*G06F 1/16* (2006.01)

(52) U.S. Cl.
CPC ........ *G06F 1/1652* (2013.01); *H04R 2499/15* (2013.01)

(58) Field of Classification Search
CPC ........ H04R 2201/021; H04R 2201/029; H04R 2205/022; H04R 2499/15; H04N 5/64; H04N 5/642; G06F 1/1601; G06F 1/1605; G06F 1/1607; G06F 1/1616; G06F 1/1641; G06F 1/1652; G06F 1/1656; G09F 9/301
See application file for complete search history.

(56) References Cited

U.S. PATENT DOCUMENTS

| | | | |
|---|---|---|---|
| 9,760,975 B2* | 9/2017 | Kim | .......................... G09F 9/00 |
| 2011/0132557 A1 | 6/2011 | Kuroi et al. | |
| 2015/0341714 A1 | 11/2015 | Ahn et al. | |
| 2016/0363960 A1* | 12/2016 | Park | ...................... G06F 1/1656 |
| 2016/0374228 A1 | 12/2016 | Park et al. | |
| 2017/0161868 A1 | 6/2017 | Kim et al. | |
| 2017/0280246 A1* | 9/2017 | Choi | ........................ H04R 5/02 |
| 2017/0289694 A1 | 10/2017 | Choi et al. | |
| 2019/0166429 A1 | 5/2019 | Lee et al. | |
| 2020/0160760 A1 | 5/2020 | Park et al. | |
| 2020/0192557 A1 | 6/2020 | Yi et al. | |
| 2020/0314552 A1 | 10/2020 | Kim et al. | |
| 2020/0374634 A1 | 11/2020 | Ohashi et al. | |

FOREIGN PATENT DOCUMENTS

| | | |
|---|---|---|
| CN | 102103317 A | 6/2011 |
| CN | 105096778 A | 11/2015 |
| CN | 106257569 A | 12/2016 |
| CN | 107295446 A | 10/2017 |
| CN | 107454512 A | 12/2017 |
| CN | 108006412 A | 5/2018 |
| CN | 108124218 A | 6/2018 |
| CN | 108369789 A | 8/2018 |

OTHER PUBLICATIONS

First Notification of Office Action dated Mar. 31, 2021, issued in corresponding Chinese Patent Application No. 201910730076.2.
Office Action dated Jan. 27, 2022, issued in corresponding Chinese Patent Application No. 201910730076.2.

* cited by examiner

DISPLAY APPARATUS

This application is a divisional of U.S. patent application Ser. No. 16/531,716, filed on Aug. 5, 2019, which claims the benefit of and priority to Korean Patent Application No. 10-2018-0102079, filed on Aug. 29, 2018, which is hereby incorporated by reference in its entirety as if fully set forth herein.

BACKGROUND

Technical Field

The present disclosure relates to a display apparatus, and more particularly, to a display apparatus that generates sound.

Discussion of the Related Art

Recently, as the information-oriented society advances, the display apparatus field has rapidly advanced. Various display apparatuses with excellent performance characteristics—such as thinness, low weight, and low power consumption—are being developed. Examples of display apparatuses include liquid crystal display (LCD) apparatuses, field emission display (FED) apparatuses, and light emitting display apparatuses. Recently, organic light emitting display apparatuses, liquid crystal display (LCD) apparatuses, and electrophoresis display apparatuses have been made thin, leading to research and development into flexible display apparatuses such as rollable display apparatuses including a flexible display panel capable of being wound like a roll. In rollable display apparatuses, because a sound output from a sound device travels rearward or downward with respect to a housing module, sound quality is degraded due to interference between sound reflected from a wall or the ground. Therefore, it is difficult to transfer an accurate sound, and a viewer's immersion experience is degraded.

SUMMARY

Accordingly, the present disclosure is directed to a display apparatus that substantially obviates one or more of the above-identified problems due to limitations and disadvantages of the related art.

An aspect of the present disclosure is to provide a display apparatus that allows an image generating position of a displayed image to match a sound generating position of a sound.

Another aspect of the present disclosure enhances the three-dimensionality of the sound, thereby enhancing an immersion experience of a viewer watching the image.

Another aspect of the present disclosure is to provide a display apparatus that supports a wound or unwound display panel without needing a separate rear structure.

Another aspect of the present disclosure is to provide a display apparatus that prevents interference between sounds generated by a plurality of sound generating modules.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, there is provided a display apparatus comprising: a display panel configured to display an image; a housing module including a roller configured to have the display panel wound or unwound in the housing module; a rolling module including a structure connected to an upper portion of the display panel, and configured to wind or unwind the display panel according to a folding or unfolding of the structure; a plurality of beams on one surface of display panel that extends in a first direction, and arranged in a second direction vertical to the first direction; and a vibration generating device in a portion of each of the plurality of beams, wherein the vibration generating device includes a plurality of sound generating modules configured to vibrate the display panel when the display panel is unwound from the roller and the structure is unfolded.

Additionally, there is provided a display apparatus, comprising: a display panel configured to display an image; a housing module including a roller configured to have the display panel wound or unwound in the housing module; a rolling module including a structure connected to an upper portion of the display panel, and configured to wind or unwind the display panel according to a folding or unfolding of the structure; a vibration generating device in the structure that includes a plurality of sound generating modules configured to vibrate the display panel when the display panel is unwound from the roller and the structure is unfolded; and a weighting member on one surface of the display panel that overlaps a partition region surrounding each of the plurality of sound generating modules spaced apart from the weighting member.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
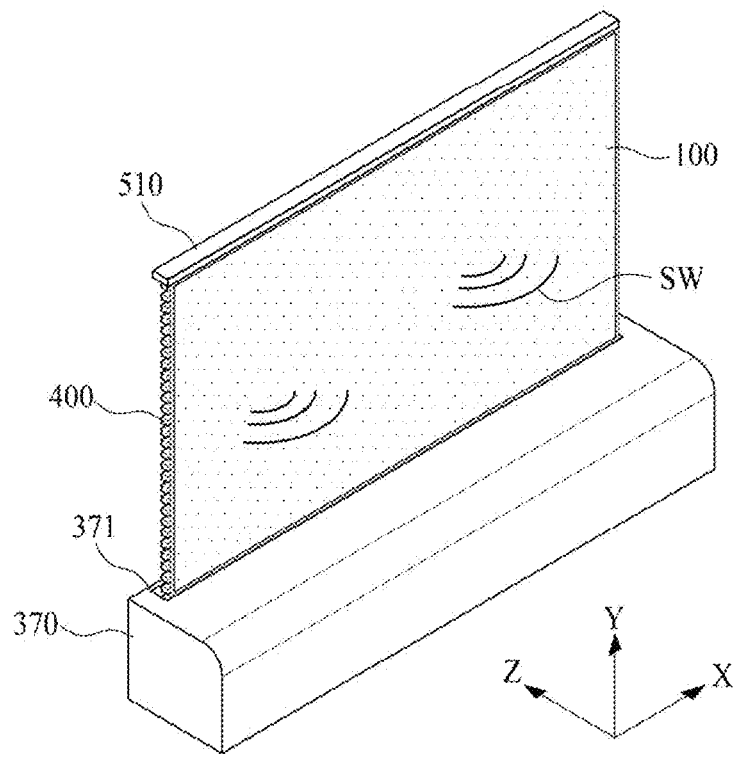
FIG. 1 illustrates a display apparatus according to an example embodiment.

Reference will now be made in detail to the example embodiments, which may be illustrated in the accompanying drawings. Wherever possible, the same reference numbers will be used throughout the drawings to refer to the same or like parts. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure will be thorough and complete, and will fully convey the scope of the present disclosure to those skilled in the art.

A shape, a size, a ratio, an angle, and a number disclosed in the drawings for describing example embodiments are merely an example. Thus, the present disclosure is not limited to the illustrated details. Unless otherwise described, like reference numerals refer to like elements throughout. In the following description, when the detailed description of the relevant known function or configuration is determined to unnecessarily obscure an important point of the present disclosure, the detailed description of such known function or configuration may be omitted. In a case where "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just," or "direct(ly)," is used. In the description of example embodiments, when a structure is described as being positioned "on or above" or "under or below" another structure, this description should be construed as including a case in which the structures contact each other as well as a case in which a third structure is disposed therebetween. In describing a time relationship, when the temporal order is described as, for example, "after," "subsequent," "next," and "before," a case that is not continuous may be included unless a more limiting term, such as "just," "immediate(ly)," or "direct(ly)," is used.

It will be understood that, although the terms like "first," "second," etc., may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" encompasses the combination of all items proposed from two or more of the first item, the second item, and the third item as well as the first item, the second item, or the third item. The size and thickness of each element shown in the drawings are given merely for the convenience of description, and example embodiments are not limited thereto, unless otherwise specified.

Features of various example embodiments may be partially or overall coupled to or combined with each other, and may be variously inter-operated with each other and driven technically as those skilled in the art can sufficiently understand. Example embodiments may be carried out independently from each other, or may be carried out together in a co-dependent relationship. Hereinafter, example embodiments of a display apparatus according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the important point of the present disclosure, the detailed description will be omitted.

In the present disclosure, examples of a display apparatus may include a narrow-sense display apparatus such as an organic light emitting display (OLED) module or a liquid crystal module (LCM) including a display panel and a driver for driving the display panel. Examples of the display apparatus may include a set device (or a set apparatus), or a set electronic device such as a notebook computer, a TV, a computer monitor, an equipment apparatus including an automotive apparatus or another type apparatuses for vehicles, or a mobile electronic device such as a smartphone or an electronic pad. These examples may be a complete product (or a final product) including an LCM or an OLED module. Therefore, in the present disclosure, examples of the display apparatus may include a narrow-sense display apparatus itself, such as an LCM or an OLED module, and a set device that is a final consumer device or an application product including the LCM or the OLED module.

In some example embodiments, an LCM or an OLED module including a display panel and a driver may be referred to as a narrow-sense display apparatus, and an electronic device that is a final product including an LCM or an OLED module may be referred to as a set device. The narrow-sense display apparatus may include a display panel, such as an LCD or an OLED, and a source printed circuit board (PCB) that is a controller for driving the display panel. The set device may further include a set PCB that is a set controller electrically connected to the source PCB to overall control the set device.

A display panel applied to the present example embodiment may use all types of display panels such as a liquid crystal display panel, an organic light emitting diode (OLED) display panel, and an electroluminescent display panel. Also, a shape or a size of a display panel applied to a display apparatus according to the present example embodiment is not limited. If the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) that is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT that is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer or a quantum dot).

Features of various example embodiments may be partially or overall coupled to or combined with each other, variously inter-operated with each other, and technically driven as those skilled in the art can sufficiently understand. The example embodiments may be carried out independently from each other, or may be carried out together in co-dependent relationship. Hereinafter, example embodiments will be described in detail with reference to the accompanying drawings.

Figure 2:
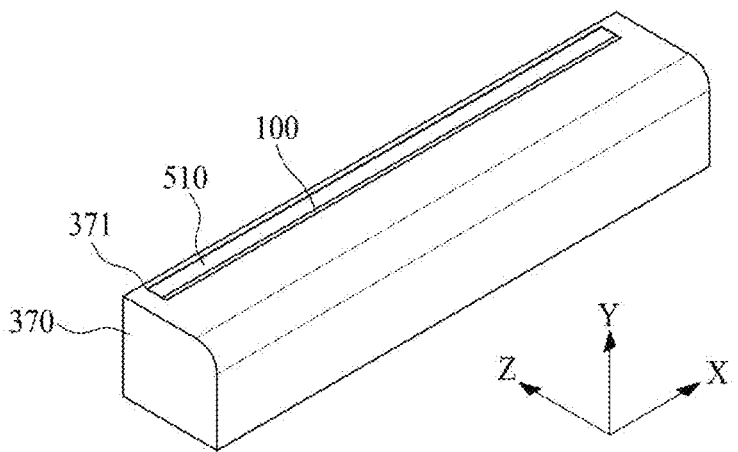
FIG. 2 illustrates a state where a display panel is loaded into a housing module, in a display apparatus according to an example embodiment.
Figure 3:
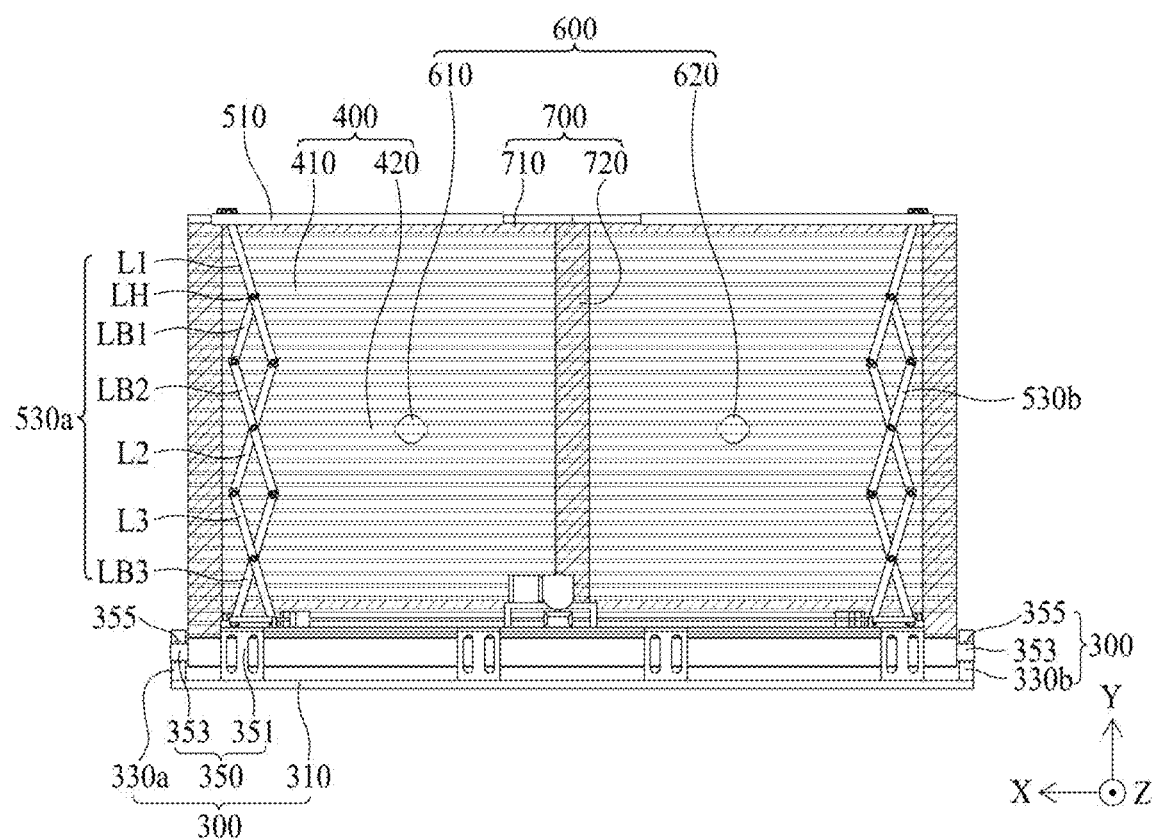
FIG. 3 is a rear perspective view illustrating a display apparatus according to an example embodiment.
Figure 4:
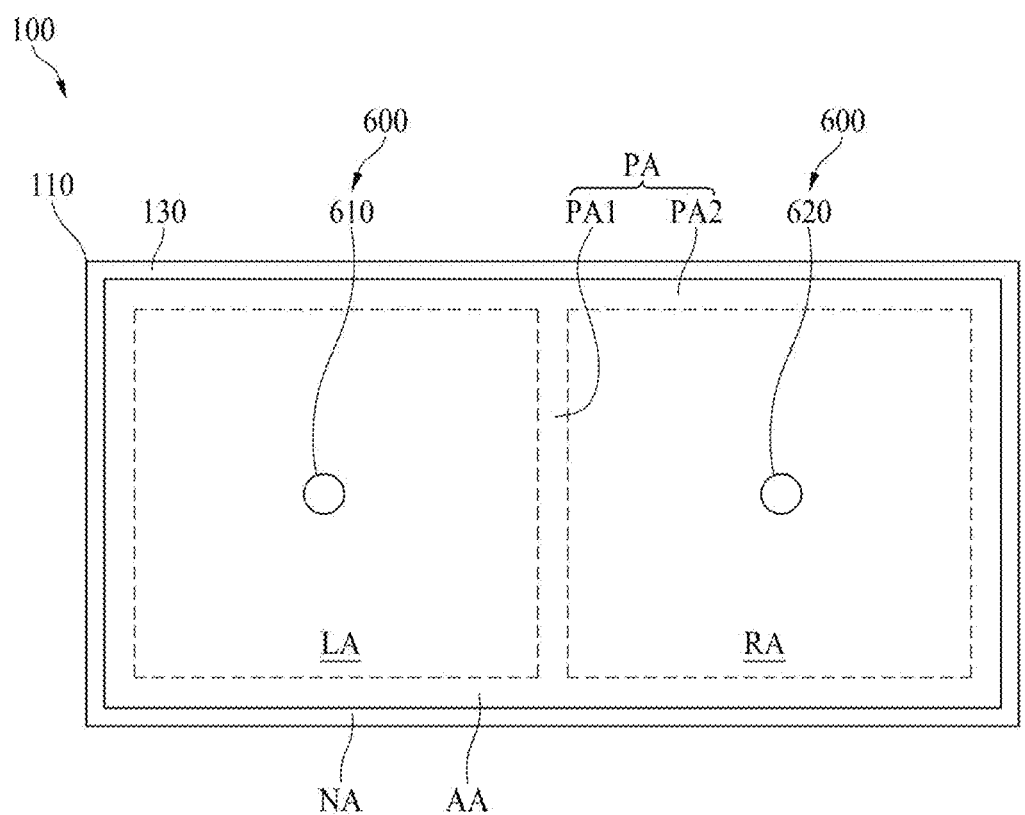
FIG. 4 is a rear perspective view illustrating a partition region in a display apparatus according to an example embodiment.
Figure 5:
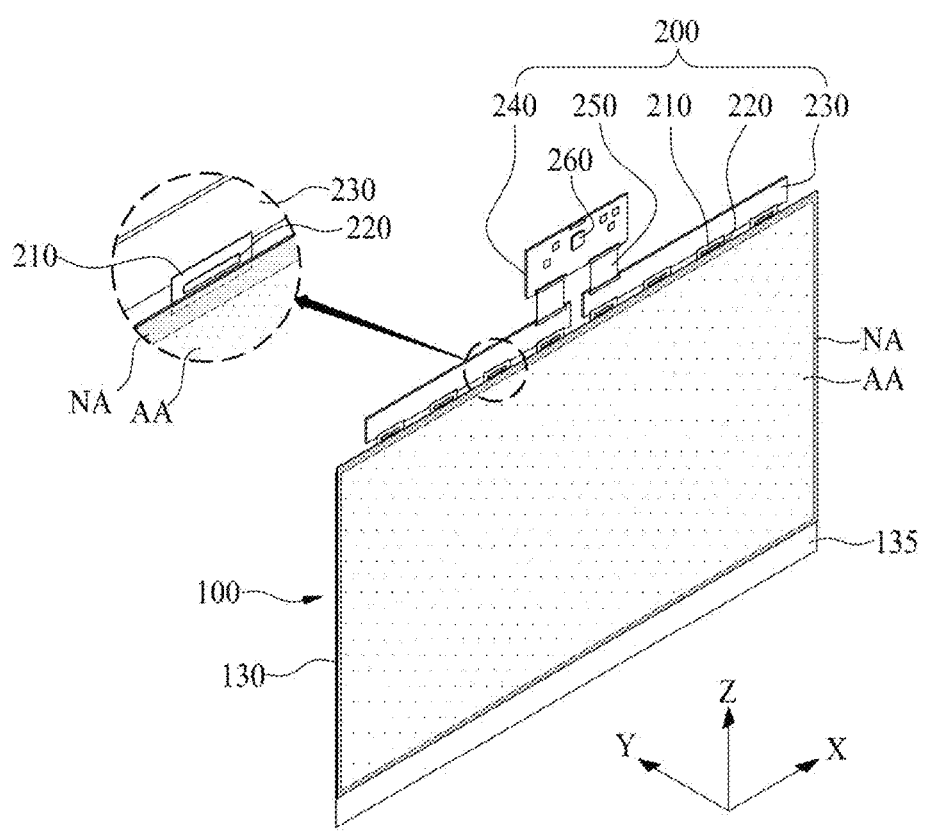
FIG. 5 illustrates a display panel and a panel driver in a display apparatus according to an example embodiment.
Figure 6:
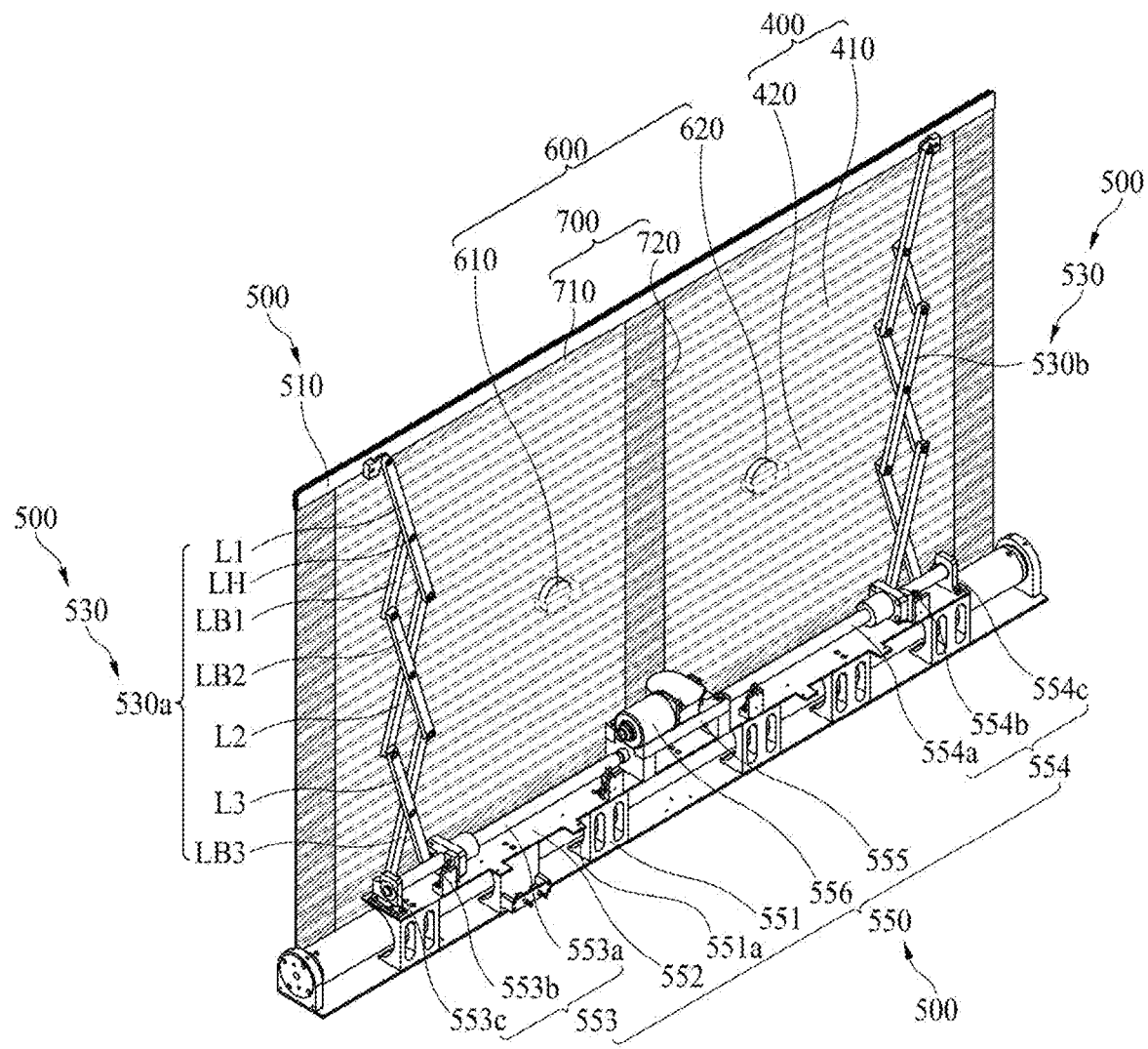
FIG. 6 is a rear perspective view illustrating a state where a structure of a rolling module is unfolded, in a display apparatus according to an example embodiment.
Figure 7:
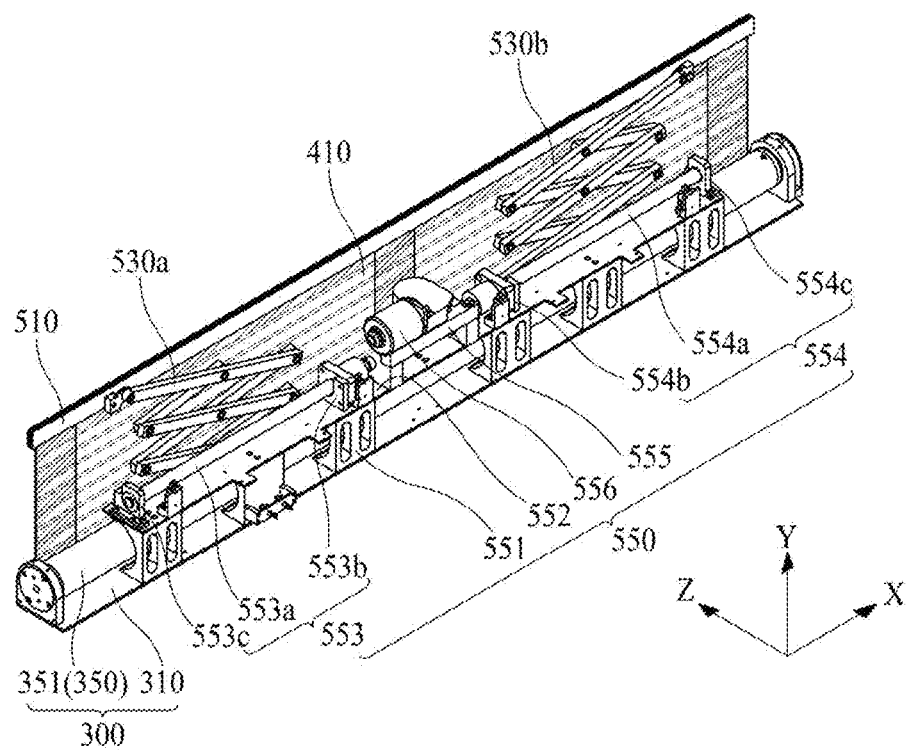
FIG. 7 is a rear perspective view illustrating a state where a structure of a rolling module is folded, in a display apparatus according to an example embodiment.
Figure 8:
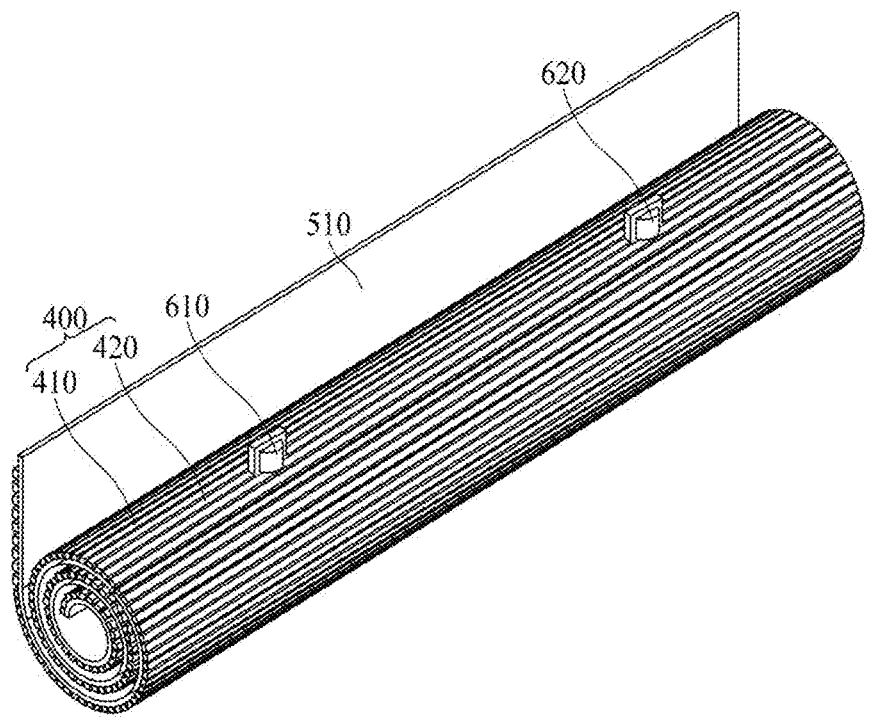
FIG. 8 illustrates a state where a display panel is wound, in a display apparatus according to an example embodiment.

FIG. 1 illustrates a display apparatus according to an example embodiment. FIG. 2 illustrates a state where a display panel is loaded into a housing module, in a display apparatus according to an example embodiment. FIG. 3 is a rear perspective view illustrating a display apparatus according to an example embodiment. FIG. 4 is a rear perspective view illustrating a partition region in a display apparatus according to an example embodiment. FIG. 5 illustrates a display panel and a panel driver in a display apparatus according to an example embodiment. FIG. 6 is a rear perspective view illustrating a state where a structure of a rolling module is unfolded, in a display apparatus according to an example embodiment. FIG. 7 is a rear perspective view illustrating a state where a structure of a rolling module is folded, in a display apparatus according to an example embodiment. FIG. 8 illustrates a state where a display panel is wound, in a display apparatus according to an example embodiment.

With reference to FIGS. 1 to 8, a display apparatus according to an example embodiment may include a display panel 100, a panel driver 200, a housing module 300, a plurality of beams 400, a rolling module 500, a vibration generating device 600, and a weighting member 700. The display panel 100 may display an image and may be implemented as any type of display panels such as a liquid crystal display panel, an organic light emitting diode (OLED) display panel, and an electroluminescent display panel.

When a structure 530 is folded, the display panel 100 may be wound, and when the structure 530 is unfolded, the display panel 100 may be unwound. Here, when a roller 350 rotates normally, the structure 530 may be folded, and when the roller 350 rotates reversely, the structure 530 may be unfolded. Also, the rolling module 500 may be connected to the roller 350 and may normally or reversely rotate the roller 350. According to an example embodiment, the display panel 100 may display an image in an unwound state. Therefore, the rolling module 500 enables the display panel 100 to be easily loaded or unloaded, the rolling module may allow the display panel 100 to be maintained in a flat state.

The display panel 100 may include a plurality of pixels for displaying an image on the basis of image data. With reference to FIG. 6, the display panel 100 may be wound (or loaded) into the housing module 300 according to driving of the rolling module 500, or may be unwound (or unloaded) from the inside of the housing module 300 and may be unfolded in a flat shape. The display panel 100 may display a two-dimensional (2D) image or a three-dimensional (3D) image including a still image or a moving image in a state where a whole display area AA is unfolded in a flat shape. Also, the display panel 100 unfolded in a flat shape may receive a vibration from the vibration generating device 600 to output a sound SW to a forward region in front of the display apparatus.

According to an example embodiment, the unfolded display panel 100 may be as a panel speaker (or a vibration plate) that vibrates based on a vibration of the vibration generating device 600 to output the sound SW. The display area AA of the unfolded display panel 100 may display an image using the pixels, and simultaneously, may vibrate based on the vibration of the vibration generating device 600 to output the sound SW. Here, the vibration generating device 600 may include a plurality of sound generating modules, and a panel vibration area of the display panel 100 may be adjusted based on the number and positions of sound generating modules. Accordingly, the display apparatus according to an example embodiment may output the sound SW of various sound bands, based on a size of the panel vibration area.

With reference to FIG. 4, the display panel 100 may include a pixel array substrate 110 and an encapsulation substrate 130. The array substrate 110 may include a display area AA, a non-display area NDA, and a pad part. Also, the display area AA may include a pixel array layer and a passivation layer. The pixel array layer may include a plurality of pixels that are provided in a pixel area defined by a plurality of gate lines and a plurality of data lines each disposed on the flexible substrate.

Each of the plurality of pixels according to an example embodiment may include a pixel driving circuit and a self-emitting device. The pixel driving circuit may allow the self-emitting device to emit light, based on a data signal supplied through a corresponding data line. The pixel driving circuit may include a driving thin film transistor (TFT) that supplies a data current, corresponding to the data signal, to the self-emitting device. The self-emitting device may emit light proportional to the amount of current supplied from the pixel driving circuit and may include an organic light emitting device layer, a quantum dot light emitting device layer, or a light emitting diode (LED) chip. Each of the plurality of pixels may have a bottom emission structure where light is output to the outside through the array substrate 110, and may have a top emission structure.

The passivation layer may be on the array substrate 110 to surround the pixel array layer. The passivation layer may prevent oxygen or water (or moisture) from penetrating into the self-emitting device. The passivation layer according to an example embodiment may include at least one inorganic layer. The inorganic layer may be formed of at least one of silicon nitride, aluminum nitride, zirconium nitride, titanium nitride, hafnium nitride, tantalum nitride, silicon oxide, aluminum oxide, and titanium oxide. According to an example embodiment, the passivation layer may further include at least one organic layer. The organic layer may be provided to have a sufficient thickness, for preventing particles from penetrating into the self-emitting device via the inorganic layer. The passivation layer may be referred to as an encapsulation layer.

The non-display area NDA may be an edge or periphery portion of a plastic substrate surrounding the display area AA. The pad part may be in a first non-display area of the non-display area NDA and may be connected to the plurality of data lines in the display area AA. Here, the first non-display area may be a periphery of an upper portion of the array substrate 110 having a relatively longer length.

The encapsulation substrate 130 may cover a front surface, other than the first non-display area, of the array substrate 110. The encapsulation substrate 130 according to an example embodiment may be attached on the front surface of the array substrate 110 by an adhesive or a filler. The encapsulation substrate 130 may prevent oxygen or water (or moisture) from penetrating into the self-emitting device. The encapsulation substrate 130 according to an example embodiment may have a thickness of 100 um or less so as to prevent penetration of oxygen or water (or moisture) and enable the display panel 100 to be bent.

According to an example embodiment, the display panel 100 may further include a roller connection part 135. With reference to FIG. 5, the roller connection part 135 may be disposed in a lower portion (or a fourth non-display area) of the display panel 100, and the roller connection part 135 may be connected to the roller 350 of the housing module 300. The lower portion of the display panel 100 may be connected to the rolling part 351 of the roller 350 through the roller connection part 135. When the whole display area AA of the display panel 100 is unfolded in a flat shape, the roller connection part 135 may prevent a lower portion of the display area AA from being covered by the housing module 300. To this end, one portion of the roller connection part 135 may be connected to the lower portion of the display panel 100, and the other portion of the roller connection part 135 may be connected to the roller 350. When the whole display area AA of the display panel 100 is unfolded in a flat shape, one portion of the roller connection part 135 may be inside the panel entrance 371 of the housing module 300 or on the panel entrance 371.

The roller connection part 135 according to an example embodiment may include a flexible plate that includes one portion attached on the lower portion of the display panel 100 and another portion attached on the roller 350. Here, a length of a middle portion, other than the one portion and the other portion, of the flexible plate may be equal to or longer than a length between the rolling part 351 and the panel entrance 371 of the housing module 300. The flexible plate may be formed of a plastic material and/or a metal material. The roller connection part 135 according to another example embodiment may be an extension portion that extends from a lower portion of the encapsulation substrate 130 so as to be attached on the roller 350. Also, the extension portion may extend from the lower portion of the encapsulation substrate 130 to have a length that is equal to or longer than the length between the rolling part 351 and the panel entrance 371.

With reference to FIG. 5, the panel driver 200 may include a plurality of flexible circuit films 210, a data driving integrated circuit (IC) 220, a printed circuit board (PCB) 230, a control board 240, a signal cable 250, and a timing controller 260. Each of the plurality of flexible circuit films 210 may be attached between the pad part of the array substrate 110 and the PCB 230 through a film attachment process and may be formed of a tape carrier package (TCP) or a chip on flexible board (or a chip on film) (COF).

The data driving IC 220 may be provided in plurality, and the plurality of data driving ICs 220 may be respectively mounted on the plurality of flexible circuit films 210 and may be connected to the pad part through the flexible circuit films 210. The data driving IC 220 may receive pixel data and a data control signal supplied from the control board 240, convert the pixel data into an analog data signal according to the data control signal, and supply the analog data signal to a corresponding data line through the pad part.

The PCB 230 may be connected to the plurality of data flexible circuit films 210. The PCB 230 may supply a driving power and signals, supplied from the control board 240, to the data driving IC 220 and a gate driving circuit so as to display an image on each of the plurality of pixels. To this end, signal transmission lines and various power lines may be on the PCB 230. The PCB 230 may be provided as one or more, based on the number of flexible circuit films 210. The control board 240 may be connected to the PCB 230 through a signal cable 250. A timing control circuit 260, various power circuits, and a memory device may be mounted on the control board 240.

The timing control circuit 260 may align digital video data input from a host system (or a driving system) of the display apparatus according to a pixel arrangement structure to generate pixel-based pixel data and may supply the generated pixel data to the data driving IC 220. Also, the timing control circuit 260 may generate the data control signal and a gate control signal, based on the timing synchronization signal supplied from the host system, and thus, the timing control circuit 260 may control a driving timing of the data driving IC 220 by using the data control signal and may control a driving timing of the gate driving circuit using the gate control signal. The timing control circuit 260 may be implemented as an IC or a semiconductor chip and may be mounted on the control board 240 or the PCB 230.

According to an example embodiment, the panel driver 200 may further include the gate driving circuit on the array substrate 110. The gate driving circuit may be in the non-display area NDA of the array substrate 110. The gate driving circuit may generate a gate signal according to a gate control signal supplied from the outside and may supply the gate signal to a gate line corresponding to a predetermined order. According to an example embodiment, the gate driving circuit may be in the non-display area NDA of the pixel array substrate along with the driving TFT. The gate driving circuit may be provided in at least one of a second non-display area and a third non-display area of the array substrate 110. Here, the second non-display area may be a left periphery portion of the array substrate 110 having a relatively short length, and the third non-display area may be a right periphery portion of the array substrate 110 parallel to the second non-display area.

With reference to FIG. 3, the housing module 300 may correspond to a body case of the display apparatus. The housing module 300 may support the rolling module 500 and may be connected to a lower portion of the display panel 100. According to an example embodiment, the housing module 300 may include a housing plate 310, a pair of roller brackets 330a and 330b, a roller 350, and a housing cover 370. The housing plate 310 may be on a bottom portion of the housing module 300 to support the rolling module 500. The pair of roller brackets 330a and 330b may be disposed in both edges or peripheries of the housing plate 310 with respect to a first direction X and may rotatably support the roller 350. Here, the first direction X may be a widthwise direction (or a long-side lengthwise direction) of the display panel 100.

The roller 350 may be rotatably disposed between the pair of roller brackets 330a and 330b and may wind or unwind the display panel 100, based on driving of the rolling module 500. The roller 350 according to an example embodiment may include a rolling part 351 that is connected to a lower side of the display panel 100 and a pair of roller shafts 353 that are disposed on both side surfaces of the rolling part 351 and are rotatably disposed in the pair of roller brackets 330a and 330b. The rolling part 351 may have a cylindrical shape, and may have various shapes that enable the display panel 100 to be wound. The pair of roller shafts 353 may be rotatably disposed in the pair of roller brackets 330a and 330b through bearings 355 (for example, rolling bearings), respectively.

The roller 350 may further include a spiral spring that is disposed in the rolling part 351 or each of the pair of roller brackets 330a and 330b. One end of the spiral spring may be fixed to a corresponding roller shaft, and the other end of the spiral spring may be fixed to an inner surface of the rolling part 351. The spiral spring may be compressed when the display panel 100 wound around the rolling part 351 is unwound and may provide the rolling part 351 with a rotational force based on a compression restoring force when winding the display panel 100, thereby decreasing a load of the rolling module 500 when winding the display panel 100. Accordingly, the display panel 100 may be wound along an outer circumference of the rolling part 351, based on a rotational force based on a compression restoring force of the spiral spring.

The housing cover 370 may cover the pair of roller brackets 330a and 330b and the roller 350 each disposed on the housing plate 310, thereby preventing the housing plate 310, the pair of roller brackets 330a and 330b, and the roller 350 from being externally exposed. The housing cover 370 may include a panel entrance 371 through which the display panel 100 moves in or out.

The plurality of beams 400 may be disposed on one surface of the display panel 100 to extend in the first direction X and may be arranged in a second direction Y vertical to the first direction X. Here, the first direction X may be the widthwise direction (or the long-side lengthwise direction) of the display panel 100, and the second direction Y may be a lengthwise direction (or a short-side lengthwise direction) of the display panel 100. The plurality of beams 400 may be attached on a rear surface of the display panel 100 to support the unfolded display panel 100. Also, the plurality of beams 400 may be arranged in the second direction Y in a state that is not coupled or connected to one another. Therefore, even in a case where the plurality of beams 400 includes a material having high stiffness, the plurality of beams 400 may be wound along with the display panel 100 when the display panel 100 is wound.

According to an example embodiment, the plurality of beams 400 may be spaced apart from one another by a certain distance in the second direction Y, or may contact one another so that a distance between adjacent beams of the plurality of beams 400 is zero. As a distance between the beams 400 spaced apart from each other in the second direction Y is reduced, the plurality of beams 400 may efficiently support the display panel 100. Even in a case where adjacent beams 400 contact each other because a distance between adjacent beams of the plurality of beams 400 is zero, the plurality of beams 400 may be wound along with the display panel 100 when the display panel 100 is wound.

Therefore, the display apparatus according to an example embodiment may include the plurality of beams 400, and thus, even without needing a separate rear structure on the rear surface of the display panel 100, the display apparatus may have an effect of supporting the display panel 100 by using a material having high stiffness. In a case where the display apparatus according to an example embodiment includes a material having high stiffness and includes a rear structure provided as one body, the rear structure may have a problem that is not wound along with the display panel. However, the display apparatus according to an example embodiment may include the plurality of beams 400 arranged in the second direction Y, and thus, even in a case where the display apparatus includes a material having high stiffness, the plurality of beams 400 may be wound along with the display panel 100 when the display panel 100 is wound.

According to an example embodiment, the plurality of beams 400 may include a plastic material, a metal material, and/or a glass material. According to an example embodiment, the plurality of beams 400 may include a material that is higher in stiffness than the display panel 100 and is lower in density than the display panel 100. Therefore, the plurality of beams 400 may stably support the unfolded display panel 100 without increasing a total weight of the display apparatus. The plurality of beams 400 may include at least one of a magnesium (Mg) alloy material, a Mg-lithium (Li) alloy material, and an aluminum (Al) alloy material. The Mg alloy material may include at least one of Al, zinc (Zn), and manganese (Mn). The plurality of beams 400 may be a lightest material of metal materials and may have relatively high non-rigidity (stiffness/specific gravity), and thus, the plurality of beams 400 may be stably coupled or connected to one surface of the display panel 100 and may stably support the unfolded display panel 100.

The plurality of beams 400 may include a plurality of first beams 410 and a second beam 420. The plurality of first beams 410 may rectilinearly extend in the first direction X and may support the display panel 100. Also, the plurality of first beams 410 may be arranged in the second direction Y. According to an example embodiment, the plurality of first beams 410 may be spaced apart from one another by a certain distance in the second direction Y, or may contact one another so that a distance between adjacent beams of the plurality of beams 400 is zero. Also, while the plurality of first beams 410 are maintaining a state that extends from one portion to the other portion of the display panel 100 in the first direction X, the plurality of first beams 410 may continuously contact the display panel 100. Therefore, the plurality of first beams 410 may prevent or reduce the display panel 100 from being bent in the first direction X.

The second beam 420 may support the display panel 100 and may support each of a plurality of sound generating modules 610 and 620. According to an example embodiment, the second beam 420 may include a panel supporting part that supports the display panel 100 and an accommodating part that is disposed between panel supporting parts to support the plurality of sound generating modules 610 and 620.

The panel supporting part of the second beam 420 may rectilinearly extend in the first direction X and may support the display panel 100. Also, while the panel supporting part of the second beam 420 is maintaining a state that extends from one portion to the other portion of the display panel 100 in the first direction X, the panel supporting part may continuously contact the display panel 100. Therefore, the panel supporting part of the second beam 420 may prevent or reduce the display panel 100 from being bent in the first direction X.

The accommodating part of the second beam 420 may protrude from the panel supporting part to a rear region of the display apparatus and may support each of the plurality of sound generating modules 610 and 620. The accommodating part of the second beam 420 may be spaced apart from the rear surface of the display panel 100. Here, a distance between the accommodating part of the second beam 420 and the rear surface of the display panel 100 may correspond to a length of each of the plurality of sound generating modules 610 and 620. Accordingly, the accommodating part of the second beam 420 may support each of the plurality of sound generating modules 610 and 620 on the rear surface of the display panel 100.

As the structure 530 is folded or unfolded based on a normal rotation or a reverse rotation of the roller 350, the display panel 100 may be wound or unwound. The rolling module 500 may include a supporting frame 510, a structure 530, and a driver 550. The supporting frame 510 may be on an upper portion of the display panel 100 and may cover an edge or periphery of an upper portion of the display panel 100, and thus, may cover or shield the panel driver 200 connected to the display panel 100. As the structure 530 is folded or unfolded, the supporting frame 510 may be loaded into the housing module 300 or may be unloaded from the housing module 300. The supporting frame 510 may have a bar shape that covers the periphery of the upper portion of the display panel 100.

The structure 530 may include first and second structures 530a and 530b that are disposed in parallel and are connected between the supporting frame 510 and the driver 550. The first structure 530a may be connected between one portion of the supporting frame 510 and the driver 500 and may be folded or unfolded based on driving of the driver 500. According to an example embodiment, the first structure 530a may include a plurality of links L1 to Ln connected to the supporting frame 510 and a plurality of link bars LB1 to LBn rotatably connected to the plurality of links L1 to Ln by a link hinge LH. Here, the plurality of links may include first to $n^{th}$ links L1 to Ln, and the plurality of link bars may include first to $n^{th}$ link bars LB1 to LBn.

The first link L1 may be rotatably disposed on one portion of the supporting frame 510. According to an example embodiment, the first link L1 may include a first side connected to the one portion of the supporting frame 510, a second side connected to the second link L2, and a middle portion including a hollow portion between the first side and the second side. In this case, the middle portion of the first link L1 may accommodate the link hinge LH, and the first link L1 may be connected to the first link bar LB1 through the link hinge LH in the middle portion. The first link L1 may have a rectilinear shape or a non-rectilinear shape each having a certain length, based on a distance between the one portion of the supporting frame 510 and the second link L2. The first link L1 having a non-rectilinear shape may include a bent portion in the middle portion.

The first link bar LB1 may be rotatably disposed in the first link L1 using the link hinge LH. According to an example embodiment, the first link bar LB1 may include a first side inserted or accommodated into the hollow portion of the first link L1 and rotatably connected to the link hinge LH and a second side connected to the second link bar LB2. In this case, the second side of the first link bar LB1 may include a hollow portion, and the hollow portion of the second side of the first link bar LB1 may accommodate the link hinge LH. Therefore, the first link bar LB1 may be connected to the first link L1 through a link hinge LH disposed in the first side and may be connected to the second link bar LB2 through a link hinge LH disposed in the second side.

The second link L2 may be rotatably disposed on the second side of the first link L1. According to an example embodiment, the second link L2 may include a first side connected to the first link L1, a second side connected to the third link L3, and a middle portion including a hollow portion between the first side and the second side. In this case, the middle portion of the second link L2 may accommodate the link hinge LH, and the second link L2 may be connected to the second link bar LB2 through the link hinge LH in the middle portion. Also, the second side of the second link L2 may include a hollow portion, and the hollow portion of the second side of the second link L2 may accommodate the link hinge LH. The second link L2 may be connected to the third link L3 through a link hinge LH in the hollow portion of the second side. Therefore, the second link L2 may be connected to the first link L1 through a link hinge LH in the first side, connected to the third link L3 through a link hinge LH in the second side, and connected to the second link bar LB2 through a link hinge LH in the middle portion.

The second link L2 may be rotatably disposed on the second side of the first link L1. According to an example embodiment, the second link L2 may include a first side connected to the first link L1, a second side connected to the third link L3, and a middle portion including a hollow portion between the first side and the second side. In this case, the middle portion of the second link L2 may accommodate the link hinge LH, and the second link L2 may be connected to the second link bar LB2 through the link hinge LH in the middle portion. Also, the second side of the second link L2 may include a hollow portion, and the hollow portion of the second side of the second link L2 may accommodate the link hinge LH. The second link L2 may be connected to the third link L3 through a link hinge LH disposed in the hollow portion of the second side. Therefore, the second link L2 may be connected to the first link L1 through a link hinge LH in the first side, connected to the third link L3 through a link hinge LH in the second side, and connected to the second link bar LB2 through a link hinge LH in the middle portion.

Therefore, the first structure 530a may include the first to $n^{th}$ links L1 to Ln and the first to $n^{th}$ link bars LB1 to LBn that are respectively and rotatably connected to the first to $n^{th}$ links L1 to Ln by the link hinge LB. Therefore, the first structure 530a may be folded or unfolded based on a normal rotation or a reverse rotation of the roller 350. The second structure 530b may be connected between the other side of the supporting frame 510 and the driver 500 in parallel with the first structure 530a and may be folded or unfolded based on driving of the driver 500. According to an example embodiment, the second structure 530b may include a plurality of links L1 to Ln connected to the supporting frame 510 and a plurality of link bars LB1 to LBn that are respectively and rotatably connected to the plurality of links L1 to Ln by a link hinge LB. Except for that the plurality of links L1 to Ln and the plurality of link bars LB1 to LBn of the second structure 530b may be connected between the other portion of the supporting frame 510 and the driver 500. The plurality of links L1 to Ln and the plurality of link bars LB1 to LBn of the second structure 530b may be the same as the plurality of links L1 to Ln and the plurality of link bars LB1 to LBn of the first structure 530a.

The driver 550 may simultaneously fold or unfold the first structure 530a and the second structure 530b in response to a manipulation of a user (a viewer), and thus, may allow the supporting frame 510 connected to the first and second structures 510a and 530b to be loaded into or unloaded from the housing module 300. According to an example embodiment, the driver 550 may include a plurality of fixing members 551, a supporting plate 552, a first driving unit 553, a second driving unit 554, a power transfer unit 555, and a driving motor 556.

The plurality of fixing members 551 may be arranged at certain intervals or distances in the housing plate 310 of the housing module 300. Each of the plurality of fixing members 551 may surround a portion of the rolling part 351 of the housing module 300. To this end, an inner side of each of the plurality of fixing members 551 may have a curve portion 551a surrounding a portion of the rolling part 351 and may be spaced apart from an outer circumference of the rolling part 351 by a certain distance or interval. The inner side of each of the plurality of fixing members 551 and the outer circumference of the rolling part 351 may be spaced apart from each other by a distance that is equal to or greater than a winding thickness of the display panel 100 wound around the rolling part 351.

The supporting plate 552 may be on the plurality of fixing members 551 and may be on the rolling part 351. The supporting plate 552 may support the first driving unit 553, the second driving unit 554, and the power transfer unit 555. The first driving unit 553 may fold or unfold the first structure 530a, based on power transferred from the power transfer unit 555. The first driving unit 553 according to an example embodiment may include a first ball screw 553a, a first ball catch 553b, and a first link bracket 553c.

The first ball screw 553a may be on the supporting plate 552 and may be rotatably supported by the power transfer unit 555 and the first link bracket 553c. One portion of the first ball screw 553a may be rotatably connected to the power transfer unit 555, and the other portion of the first ball screw 553a may be rotatably supported by the first link bracket 553c. The first ball catch 553b may be movably fastened to the first ball screw 553a and may rotatably support the second side of the $n^{th}$ link bar LBn. The first ball catch 553b may perform a rectilinear motion in the first direction X on the first ball screw 553a based on a rotational motion of the first ball screw 553a to allow the $n^{th}$ link bar LBn to perform a rectilinear motion in the first direction X.

The first link bracket 553c may be disposed in one edge or periphery of the supporting plate 552, may rotatably support the other portion of the first ball screw 553a, and may rotatably support the second side of the $n^{th}$ link Ln in the first structure 530a. The first driving unit 553 may move the second side of the $n^{th}$ link bar LBn in the first structure 530a in a first rectilinear direction X1. This movement may be based on a rectilinear motion of the first ball catch 553b performed in the first rectilinear direction X1, based on a first-direction rotation of the first ball screw 553a, thereby folding the first structure 530a. As the second side of the $n^{th}$ link bar LBn moves in the first rectilinear direction X1, the first to $n^{th}$ links L1 to Ln and the first to $n^{th}$ link bars LB1 to LBn of the first structure 530a may be respectively folded with reference to a plurality of link hinges LH.

On the other hand, the first driving unit 553 may move the second side of the $n^{th}$ link bar LBn based on a rectilinear motion of the first ball catch 553b that is performed in a second rectilinear direction X2 based on a second-direction rotation of the first ball screw 553a, thereby unfolding the first structure 530a. Here, the second-direction rotation of the first ball screw 553a may be opposite to the first-direction rotation, and the second rectilinear direction X2 may be opposite to the first rectilinear direction X1. As the second side of the $n^{th}$ link bar LBn moves in the second rectilinear direction X2, the first to $n^{th}$ links L1 to Ln and the first to $n^{th}$ link bars LB1 to LBn of the first structure 530a may be respectively folded with reference to a plurality of link hinges LH.

The second driving unit 554 may fold or unfold the second structure 530b, based on power transferred from the power transfer unit 555. According to an example embodiment, the second driving unit 554 may include a second ball screw 554a, a second ball catch 554b, and a second link bracket 554c. Here, configurations of the second ball screw 554a, the second ball catch 554b, and the second link bracket 554c of the second driving unit 554 may respectively correspond to configurations of the first ball screw 553a, the first ball catch 553b, and the first link bracket 553c of the first driving unit 553, and thus, their repetitive descriptions are omitted.

The power transfer unit 555 may be disposed on the middle portion of the supporting plate 552, may rotatably support one portion of the first ball screw 553a and one portion of the second ball screw 554a, and may transfer a rotational power of the driving motor 556 to the one end of the first ball screw 553a and the one end of the second ball screw 554a. According to an example embodiment, the power transfer unit 555 may include a rotation gear, a first pinion gear, and a second pinion gear. The power transfer unit 555 including the rotation gear and the first and second pinion gears may be referred to as a bevel gear box including a gear and a pinion. The driving motor 556 may be on the power transfer unit 555 and may rotate the rotation gear of the power transfer unit 555 in response to a manipulation of a user (or a viewer).

The vibration generating device 600 may include a plurality of sound generating modules 610 and 620 that are disposed in a portion of each of the plurality of beams 400 and vibrate the display panel 100 that is unwound from the roller 350 and is unfolded. Each of the plurality of sound generating modules 610 and 620 may be fixed to the second beam 420 and may vibrate the display panel 100 to output a sound SW to a forward region in front of the display panel 100. The vibration generating device 600 may use the display panel 100 as a vibration plate to generate the sound SW. The vibration generating device 600 may directly vibrate the display panel 100 to generate the sound SW.

According to an example embodiment, the vibration generating device 600 may include first and second sound generating modules 610 and 620 that vibrate different regions of the display panel 100. Each of the first and second sound generating modules 610 and 620 may be fixed through the second beam 420 and may be disposed apart from each other. The display panel 100 may include a left region LA and a right region RA, the first sound generating module 610 may overlap the left region LA of the display panel 100, and the second sound generating module 620 may overlap the right region RA of the display panel 100. Therefore, the first sound generating module 610 may vibrate the left region LA of the display panel 100, and the second sound generating module 620 may vibrate the right region RA of the display panel 100. Here, the first and second sound generating modules 610 and 620 may receive different vibration signals and may be independently driven.

According to an example embodiment, the vibration generating device 600 may be a speaker and may include a sound actuator, a sound exciter, or a piezoelectric device, and may be a sound device that outputs sound based on an electrical signal. The weighting member 700 may be between the plurality of beams 400 and the display panel 100 to overlap a partition area PA that surrounds each of the plurality of sound generating modules 610 and 620 so as to be spaced apart from the plurality of sound generating modules 610 and 620. According to an example embodiment, when the plurality of beams 400 include the plurality of first beams 410 and the second beam 420 including the panel supporting part and the accommodating part, the weighting member 700 may be disposed in the plurality of first beams 410 and the panel supporting part of the second beam 420.

According to an example embodiment, the weighting member 700 may be as a mass member that torsionally or repeatedly vibrates based on inertia based on a vibration. The weighting member 700 may increase an inertia moment of the display panel 100 that vibrates based on a vibration, transferred thereto, of each of the plurality of sound generating modules 610 and 620. When the display panel 100 vibrates, the weighting member 700 may increase the inertia moment of the display panel 100 to prevent the vibration of the display panel 100 from passing through the partition area PA, thereby preventing interference of a sound output from each of the plurality of sound generating modules 610 and 620.

The partition area PA may include a first partition area PA1 extending in the first direction X and a second partition area PA2 that is connected to the first partition area PA1 and extends in the second direction Y. The first partition area PA1 may include a plurality of first partition areas PA1 that may be disposed in parallel in a widthwise direction (or a long-side lengthwise direction) of the display panel 100. The second partition area PA2 may include a plurality of second partition areas PA2, and may be disposed in parallel in a lengthwise direction (or a short-side lengthwise direction) of the display panel 100.

The weighting member 700 may include first and second weighting members 710 and 720. The first weighting member 710 may be accommodated into a portion of each of the plurality of first beams 410 to overlap the first partition area PA1. The first weighting member 710 may be disposed to overlap each of an upper portion and a lower portion of the display panel 100 and may increase an inertia moment of an edge or periphery of each of the upper portion and the lower portion of the display panel 100. Therefore, the first weighting member 710 may prevent a vibration generated by each of the first and second sound generating modules 610 and 620 from passing through the first partition area PA1. In other words, the first weighting member 710 may prevent the vibration generated by each of the first and second sound generating modules 610 and 620 from being attenuated through the edge or periphery of each of the upper portion and the lower portion of the display panel 100.

The second weighting member 720 may be accommodated into at least a portion of each of the plurality of first beams 410 to overlap the second partition area PA2. Also, the second weighting member 720 may be provided in plurality, and because the second weighting members 720 are accommodated into the plurality of beams 400 arranged in the second direction Y, the second weighting members 720 may be spaced apart from one another in the second direction Y.

The second weighting member 720 may be disposed to overlap each of a left side, a center vertical axis, and a right portion of the display panel 100 and may increase an inertia moment of an edge or periphery of each of the left side, the center vertical axis, and the right side of the display panel 100. Therefore, the second weighting member 720 may prevent the vibration generated by each of the first and second sound generating modules 610 and 620 from passing through the second partition area PA2. In other words, the second weighting member 720 may prevent interference between the vibrations generated by the first and second sound generating modules 610 and 620 and may prevent the vibrations from being attenuated through the edge or periphery of each of the left portion and the right portion of the display panel 100.

According to an example embodiment, the weighting member 700 may be formed of a material that is greater in density than the display panel 100. Also, the weighting member 700 may be formed of a material that is greater in density than the plurality of beams 400. The weighting member 700 may include a material such as iron (Fe), copper (Cu), nickel (Ni), gold (Au), silver (Ag), and/or titanium (Ti), which has a greater density than other materials.

Figure 9A:
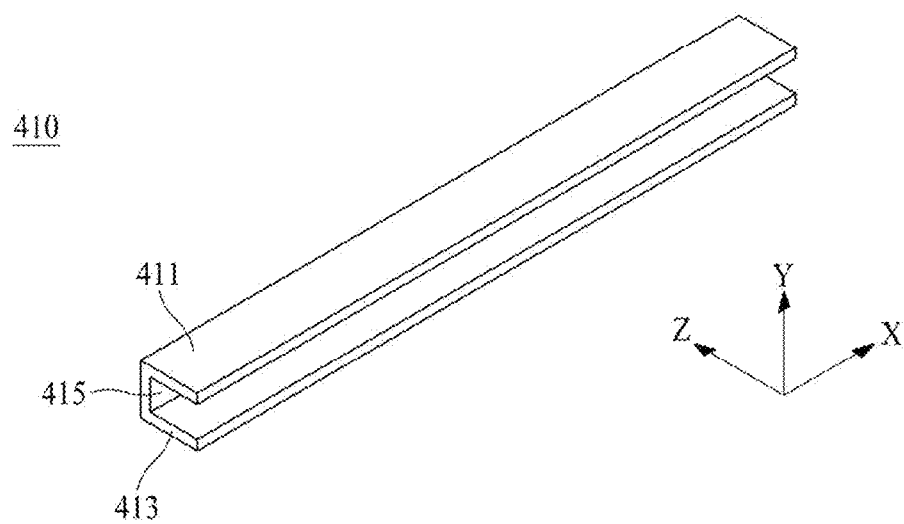
FIG. 9A illustrates a first beam, in a display apparatus according to an example embodiment.
Figure 9B:
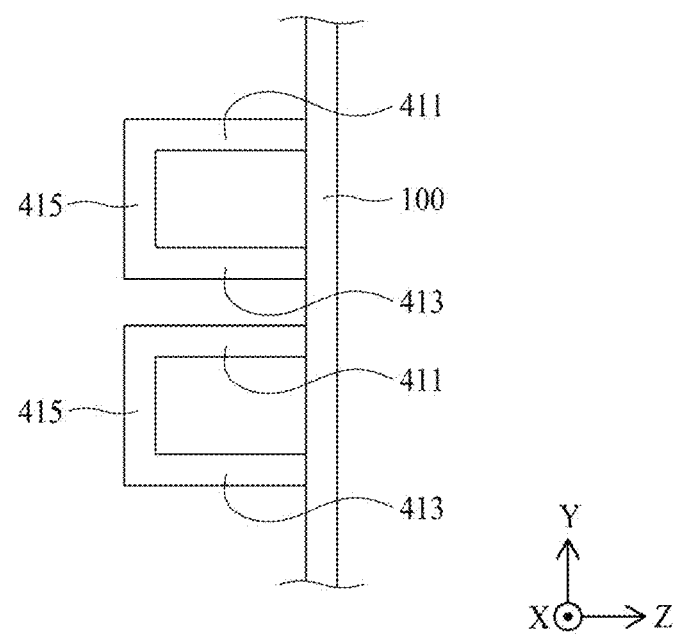
FIG. 9B is a cross-sectional view illustrating a display panel and a first beam, in a display apparatus according to an example embodiment.
Figure 9C:
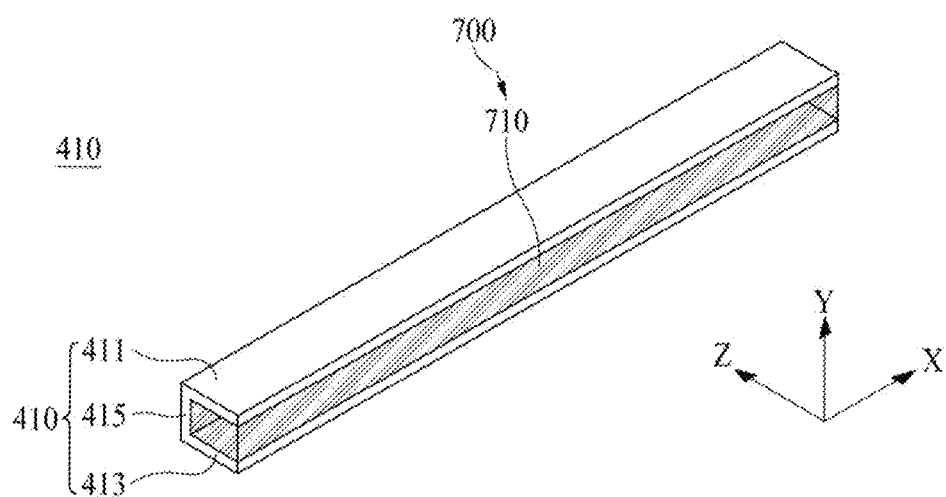
FIG. 9C illustrates a first beam and a first weighting member, in a display apparatus according to an example embodiment.
Figure 9D:
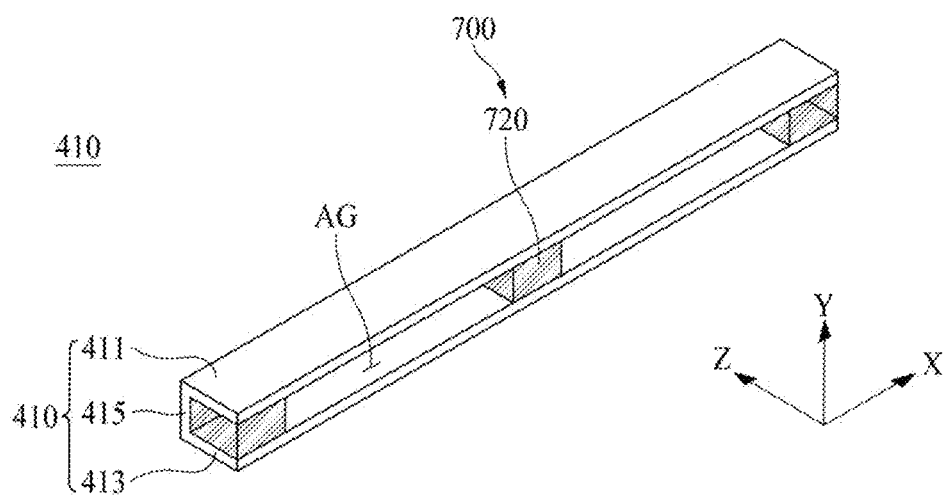
FIG. 9D illustrates a first beam and a second weighting member, in a display apparatus according to an example embodiment.

FIG. 9A illustrates a first beam, in a display apparatus according to an example embodiment. FIG. 9B is a cross-sectional view illustrating a display panel and a first beam, in a display apparatus according to an example embodiment. FIG. 9C illustrates a first beam and a first weighting member, in a display apparatus according to an example embodiment. FIG. 9D illustrates a first beam and a second weighting member, in a display apparatus according to an example embodiment.

With reference to FIGS. 9A to 9D, a plurality of beams 400 may include a plurality of first beams 410 and a second beam 420. The plurality of first beams 410 may rectilinearly extend in the first direction X and may support the display panel 100. Also, the plurality of first beams 410 may be arranged in the second direction Y. According to an example embodiment, the plurality of first beams 410 may be spaced apart from one another by a certain distance in the second direction Y, or may contact one another so that a distance between adjacent beams of the plurality of beams 400 is zero. Also, while the plurality of first beams 410 are maintaining a state that extends from one portion to the other portion of the display panel 100 in the first direction X, the plurality of first beams 410 may continuously contact the display panel 100. Therefore, the plurality of first beams 410 may prevent or reduce the display panel 100 from being bent in the first direction X.

According to an example embodiment, the plurality of first beams 410 may include first and second supporting parts 411 and 413 and a connection part 415. Each of the first and second supporting parts 411 and 413 may be attached on one surface of the display panel 100 and may protrude from the one surface of the display panel 100 to a rear region of the display panel 100. Also, the connection part 415 may connect the first supporting part 411 to the second supporting part 413. Because the plurality of first beams 410 are attached on the one surface of the display panel 100, an air gap AG surrounded by the first and second supporting parts 411 and 413, the connection part 415, and the display panel 100 may be formed. Accordingly, the plurality of first beams 410 may allow a sound generated based on a vibration of the display panel 100 to concentrate on a forward region in front of the display apparatus.

A cross-sectional surface of each of the plurality of first beams 410 may have a C-shape. As another example, the cross-sectional surface of each of the plurality of first beams 410 may have a U-shape or a V-shape. The cross-sectional surface of each of the plurality of first beams 410 may have any shape capable of supporting the display panel 100, being wound along with the display panel 100, and accommodating a weighting member 700.

The weighting member 700 may include first and second weighting members 710 and 720. The first weighting member 710 may be accommodated into a portion of each of the plurality of first beams 410 to overlap the first partition area PA1. The first weighting member 710 may be disposed to overlap each of an upper portion and a lower portion of the display panel 100 and may increase an inertia moment of an edge or periphery of each of the upper portion and the lower portion of the display panel 100. Therefore, the first weighting member 710 may prevent a vibration generated by each of the first and second sound generating modules 610 and 620 from passing through the first partition area PA1. In other words, the first weighting member 710 may prevent the vibration generated by each of the first and second sound generating modules 610 and 620 from being attenuated through the edge or periphery of each of the upper portion and the lower portion of the display panel 100.

The first weighting member 710 may be accommodated into the plurality of first beams 410 to overlap the first partition area PA1. The first weighting member 710 may be disposed between the plurality of first beams 410 and the display panel 100. The first weighting member 710 may be surrounded by the display panel 100, the first and second supporting parts 411 and 413, and the connection part 415 of each of the plurality of first beams 410. The first weighting member 710 may increase the inertia moment of the display panel 100 to prevent the vibration generated by each of the first and second sound generating modules 610 and 620 from passing through the first partition region PA1.

The second weighting member 720 may be accommodated into at least a portion of each of the plurality of first beams 410 to overlap the second partition area PA2. The second weighting member 720 may be disposed between the plurality of first beams 410 and the display panel 100. In this case, the second weighting member 720 may be provided in plurality, and the plurality of second weighting members 720 may be spaced apart from one another in the first direction X in one first beam 410 and may be spaced apart from one another in the second direction Y in the plurality of beams 400 arranged in the second direction Y. The second weighting member 720 may increase the inertia moment of the display panel 100 to prevent the vibration generated by each of the first and second sound generating modules 610 and 620 from passing through the second partition region PA2. In other words, the second weighting member 720 may prevent interference between the vibrations generated by the first and second sound generating modules 610 and 620 and may prevent the vibrations from being attenuated through the edge or periphery of each of the left portion and the right portion of the display panel 100.

Moreover, because at least some of the plurality of first beams 410 are attached on the one surface of the display panel 100 and accommodate the second weighting member 720, an air gap AG surrounded by the first and second supporting parts 411 and 413, the connection part 415, the display panel 100, and the second weighting member 720 may be formed. Accordingly, the plurality of first beams 410 may allow a sound generated based on a vibration of the display panel 100 to concentrate on a forward region in front of the display apparatus.

Figure 10A:
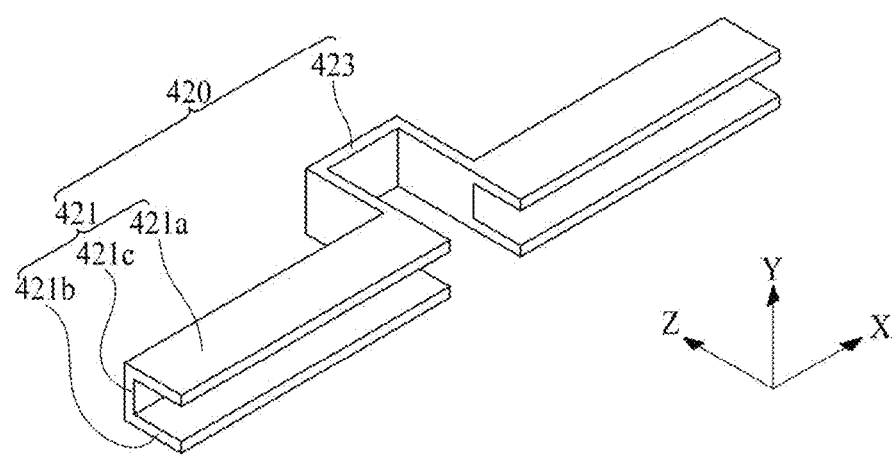
FIG. 10A illustrates a second beam, in a display apparatus according to an example embodiment.
Figure 10B:
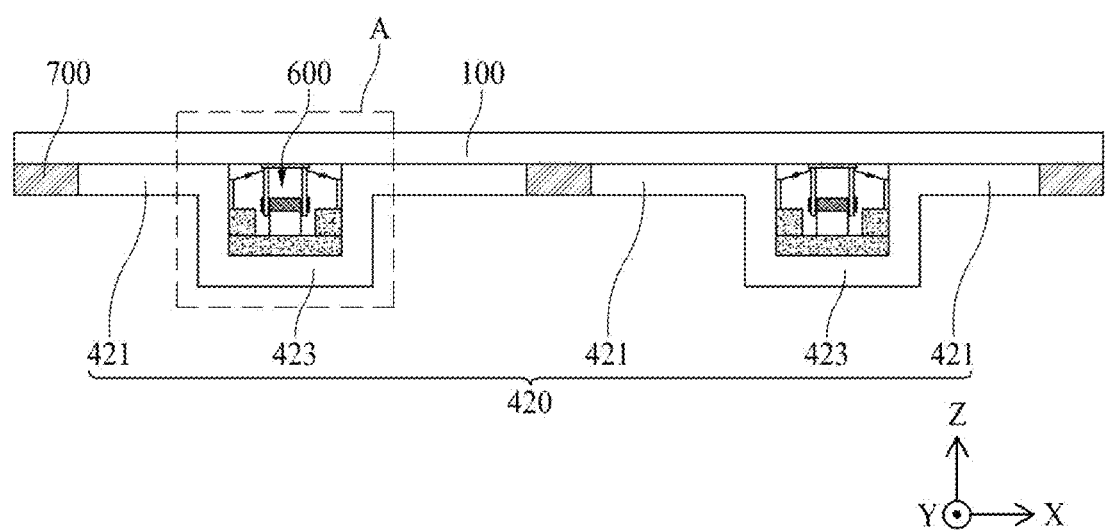
FIG. 10B is a cross-sectional view illustrating a display panel, a second beam, and a vibration generating device in a display apparatus according to an example embodiment.
Figure 10C:
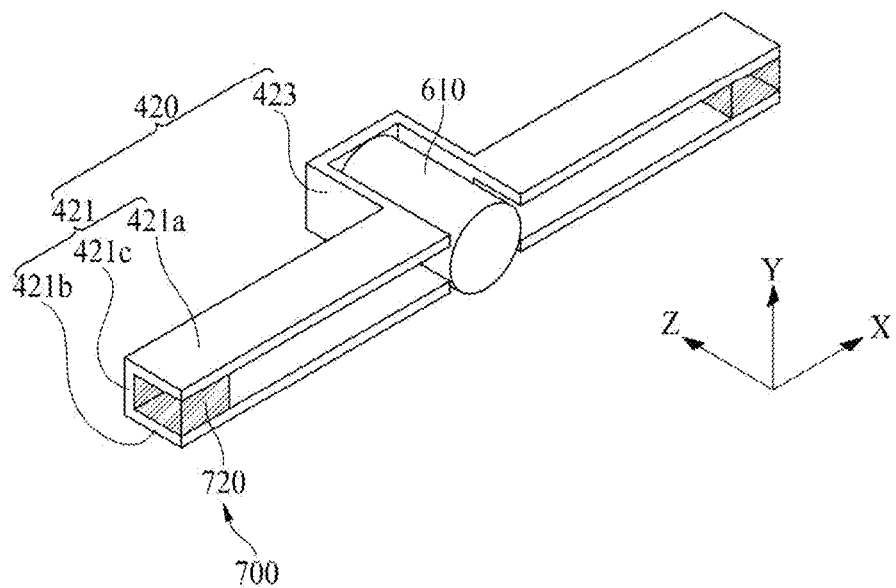
FIG. 10C illustrates a second beam, a vibration generating device, and a second weighting member, in a display apparatus according to an example embodiment.

FIG. 10A illustrates a second beam, in a display apparatus according to an example embodiment. FIG. 10B is a cross-sectional view illustrating a display panel, a second beam, and a vibration generating device in a display apparatus according to an example embodiment. FIG. 10C illustrates a second beam, a vibration generating device, and a second weighting member, in a display apparatus according to an example embodiment. With reference to FIGS. 10A to 10C, a second beam 420 may support a display panel 100 and may support each of a plurality of sound generating modules 610 and 620. According to an example embodiment, the second beam 420 may include a panel supporting part 421 that supports the display panel 100 and an accommodating part 423 that is disposed between adjacent panel supporting parts 421 to support the plurality of sound generating modules 610 and 620.

The panel supporting part 421 of the second beam 420 may rectilinearly extend in the first direction X and may support the display panel 100. Also, while the panel supporting part 421 of the second beam 420 is maintaining a state that extends from one portion to the other portion of the display panel 100 in a first direction X, the panel supporting part 421 may continuously contact the display panel 100. Therefore, the panel supporting part 421 of the second beam 420 may prevent or reduce the display panel 100 from being bent in the first direction X.

The panel supporting part 421 of the second beam 420 may include first and second supporting parts 421a and 421b and a connection part 421c. Each of the first and second supporting parts 421a and 421b may be attached on one surface of the display panel 100 and may protrude from the one surface of the display panel 100 to a rear region behind the display panel 100. Also, the connection part 421a may connect the first supporting part 421a to the second supporting part 421b. Because the panel supporting part 421 of the second beam 420 is attached on the one surface of the display panel 100, an air gap AG surrounded by the first and second supporting parts 421a and 421b, the connection part 421c, and the display panel 100 may be formed. Accordingly, the panel supporting part 421 of the second beam 420 may allow a sound generated based on a vibration of the display panel 100 to concentrate on a forward region in front of the display apparatus.

A cross-sectional surface of the panel supporting part 421 of the second beam 420 may have a C-shape. As another example, the cross-sectional surface of the panel supporting part 421 of the second beam 420 may have a U-shape or a V-shape. A shape of the panel supporting part 421 of the second beam 420 may have any shape capable of supporting the display panel 100, being wound along with the display panel 100, and accommodating a weighting member 700.

The second weighting member 720 may be accommodated into the panel supporting part 421 of the second beam 420 to overlap a second partition area PA2. The second weighting member 720 may be between the panel supporting part 421 of the second beam 420 and the display panel 100. The second weighting member 720 may increase an inertia moment of the display panel 100 to prevent the vibration generated by each of the first and second sound generating modules 610 and 620 from passing through the second partition region PA2. In other words, the second weighting member 720 may prevent interference between the vibrations generated by the first and second sound generating modules 610 and 620 and may prevent the vibrations from being attenuated through the edge or periphery of each of a left portion and a right portion of the display panel 100.

The accommodating part 423 of the second beam 420 may protrude from the panel supporting part 421 to a rear region behind the display apparatus and may support each of the plurality of sound generating modules 610 and 620. The accommodating part 423 of the second beam 420 may be spaced apart from a rear surface of the display panel 100. Here, a distance between the accommodating part 423 of the second beam 420 and the rear surface of the display panel 100 may correspond to a length of each of the plurality of sound generating modules 610 and 620. Therefore, the accommodating part 423 of the second beam 420 may support each of the plurality of sound generating modules 610 and 620 disposed on the rear surface of the display panel 100.

Moreover, the panel supporting part 421 of the second beam 420 may be attached on one surface of the display panel 100 and may accommodate the second weighting member 720, and the accommodating part 423 may accommodate the sound generating module 610. Therefore, an air gap AG surrounded by the first and second supporting parts 421a and 421b, the connection part 421c, the display panel 100, the second weighting member 720, and the sound generating module 610 may be formed. Accordingly, the second beam 420 may allow a sound generated based on a vibration of the display panel 100 to concentrate on a forward region in front of the display apparatus.

Figure 11:
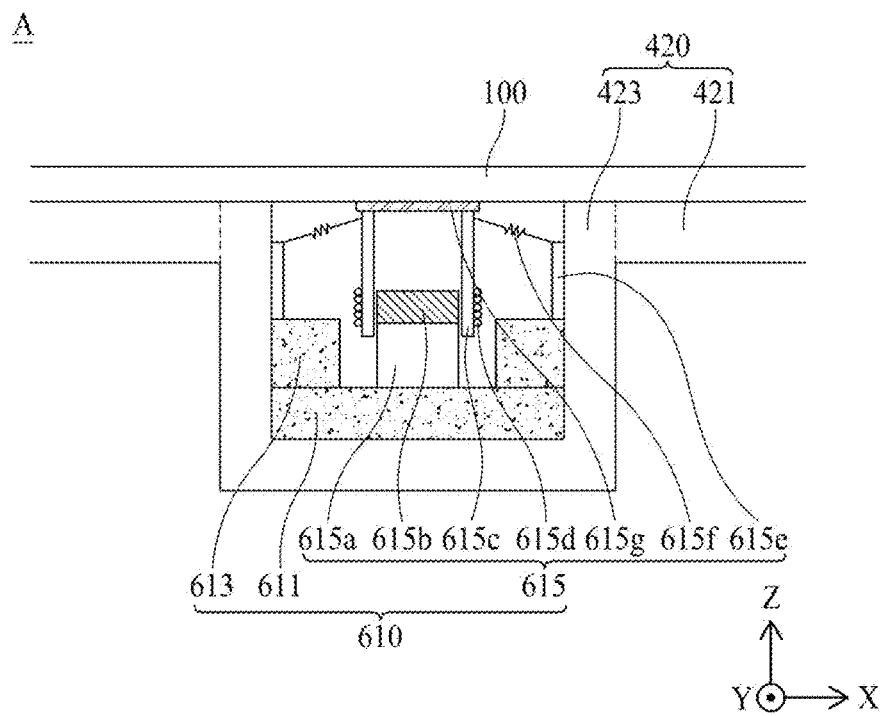
FIG. 11 is an enlarged view of a region 'A' illustrated in FIG. 10B.

FIG. 11 is an enlarged view of a region 'A' illustrated in FIG. 10B. With reference to FIG. 11, a sound generating module 610 may be disposed in the accommodating part 423 of the second beam 420. The vibration generating module 610 may be a speaker and may include a sound actuator, a sound exciter, or a piezoelectric device, and may be a sound device that outputs sound based on an electrical signal. According to an example embodiment, the sound generating module 610 may include a module frame 611, a side frame 613, and a vibration unit 615.

The module frame 611 may be supported by the accommodating part 423 of the second beam 420 and may support the sound generating module 610. The module frame 611 may support the side frame 613 and the magnet member 615a. The module frame 611 may be as a lower plate that is disposed under the magnet member 615a. Therefore, the sound generating module 610 may not include a separate lower plate, and the upper plate 615b and the module frame 611 may be disposed on and under the magnet member 615a and may increase a magnetic flux density generated through the magnet member 615a.

The side frame 613 may be on the module frame 611, and may surround a lower portion of the vibration unit 615 that is spaced apart from the side frame 613. The side frame 613 may surround the magnet member 615a that is spaced apart from the side frame 613, and thus, may allow a magnetic flux generated by the magnet member 615a from concentrating on the inside of the vibration unit 615, thereby preventing leakage of the magnetic flux. Therefore, the upper plate 615b may be disposed in an upper portion of the magnet member 615a, the module frame 611 may be disposed in a lower portion of the magnet member 615a, and the side frame 613 may surround a side surface of the magnet member 615a spaced apart from the side frame 613. This may prevent leakage of the magnetic flux generated by the magnet member 615a, increase the magnetic flux, and enhance a vibration characteristic.

The vibration unit 615 may be on the module frame 611 to vibrate the display panel 100. By using the module frame 611 as a supporter, the vibration unit 615 may vibrate the display panel 100 according to a vibration signal corresponding to a sound signal associated with an image. The vibration unit 615 may include the magnet member 615a, the upper plate 615b, a bobbin 615c, a coil 615d, an external frame 615e, a damper 615f, and a bobbin ring 615g.

The magnet member 615a may be on the module frame 611. The magnet member 615a may be between the upper plate 615b and the module frame 611 and may be surrounded by the side frame 503 spaced apart from the magnet member 615a. According to an example embodiment, the upper plate 615b may be disposed on one portion of the magnet member 615a, and the module frame 611 may be disposed on the other portion opposite the one end, whereby the upper plate 615b and the module frame 611 may control the magnetic flux generated by the magnet member 615a. Accordingly, the magnet member 615a may be between the upper plate 615b and the module frame 611, and thus, the magnetic flux generated by the magnet member 615a may concentrate on the inside of the vibration unit 615, thereby preventing leakage of the magnetic flux.

The upper plate 615b may be disposed in an upper portion of the magnet member 615a and may be spaced apart from the display panel 100. Also, the magnet member 615a and the upper plate 615b may be inserted or accommodated into the bobbin 615c having a cylindrical shape, and thus, an outer circumference surface of each of the magnet member 615a and the upper plate 615b may be surrounded by the bobbin 615c. Accordingly, the magnet member 615a and the upper plate 615b may guide a rectilinear reciprocating motion of the bobbin 615c.

The bobbin 615c may be surround the upper plate 615b and may be disposed on a rear surface of the display panel 100 through the bobbin ring 615g. The bobbin 615c may surround the magnet member 615a and the upper plate 615b and may be surrounded by the side frame 613 spaced apart from the bobbin 615c. When a magnetic field is generated in the vibration unit 615 with a sound-generating current applied to the coil 615d wound around an outer circumference surface of the bobbin 615c, the bobbin 615c may vibrate the vibration plate with the magnetic field by using the bobbin ring 615g. Therefore, a front surface of the bobbin 615c may contact the bobbin ring 615g, and the bobbin 615c may vibrate the display panel 100 through the bobbin ring 615g according to whether a current is applied thereto or not.

The coil 615d may be wound around the outer circumference surface of the bobbin 615c and may be surrounded by the magnet member 615a spaced apart from the coil 615d. The coil 615d may be wound around the outer circumference surface of the bobbin 615c, may surround the magnet member 615a spaced apart from the coil 615d, and may be supplied with the sound-generating current. Here, the coil 615d may be referred to as a voice coil. When the sound-generating current is applied to the coil 615d, the bobbin 615c may move through guiding by the damper 615f according to Fleming's left-hand law based on an external magnetic field generated around the magnet member 615a and an application magnetic field generated around the coil 615d. A magnetic flux generated from a magnetic field may flow along a closed loop that is formed by a sequential connection of the coil 615d, the side frame 613, the module frame 611, the magnet member 615a, the upper plate 615b, and the coil 615d. Therefore, the bobbin 615c may vibrate while being guided by the damper 615f and may transfer the vibration to the display panel 100.

The external frame 615e may be on the side frame 613. The external frame 615e may extend from an outer portion of an upper portion of the side frame 613 to the display panel 100. Also, the external frame 615e may be spaced apart from the bobbin 615c in parallel with the bobbin 615c. An upper portion of the external frame 615e may be connected to the damper 615f and may support one portion of the damper 615f. Accordingly, the other portion of the damper 615f may be connected to the bobbin 615c, and while the damper 615f is guiding a vibration of the bobbin 615c, the external frame 615e may be fixed to an upper portion of the side frame 613 and may support one portion of the damper 615f.

The damper 615f may be between the external frame 615e and the bobbin 615c and may guide the vibration of the bobbin 615c. The one portion of the damper 615f may be connected to an upper portion of the external frame 615e, and the other portion of the damper 615f may be connected to the bobbin 615c. The damper 615f may have a structure where is creased between the one portion and the other portion of the damper 615f and may be contracted and relaxed based on a rectilinear reciprocating motion of the bobbin 615c to control and guide the vibration of the bobbin 615c. Therefore, the damper 615f may be connected between the external frame 615e and the bobbin 615c, and thus, may limit or adjust a vibration distance of the bobbin 615c using a restoring force of the damper 615f. When the bobbin 615c vibrates by a certain distance or more or vibrates by a certain distance or less, the bobbin 615c may be restored to an original position by the restoring force of the damper 615f.

The bobbin ring 615g may be disposed between the bobbin 615c and the display panel 100 and may transfer the vibration of the bobbin 615c to the display panel 100. Also, the bobbin ring 615g may attach the bobbin 615c on a rear surface of the display panel 100. The bobbin ring 615g may be implemented with a double-sided tape. Also, the bobbin ring 615g may block heat occurring in the bobbin 615c so as not to be transferred to the display panel 100 and may efficiently transfer a vibration of the bobbin 615c to the display panel 100.

Figure 12:
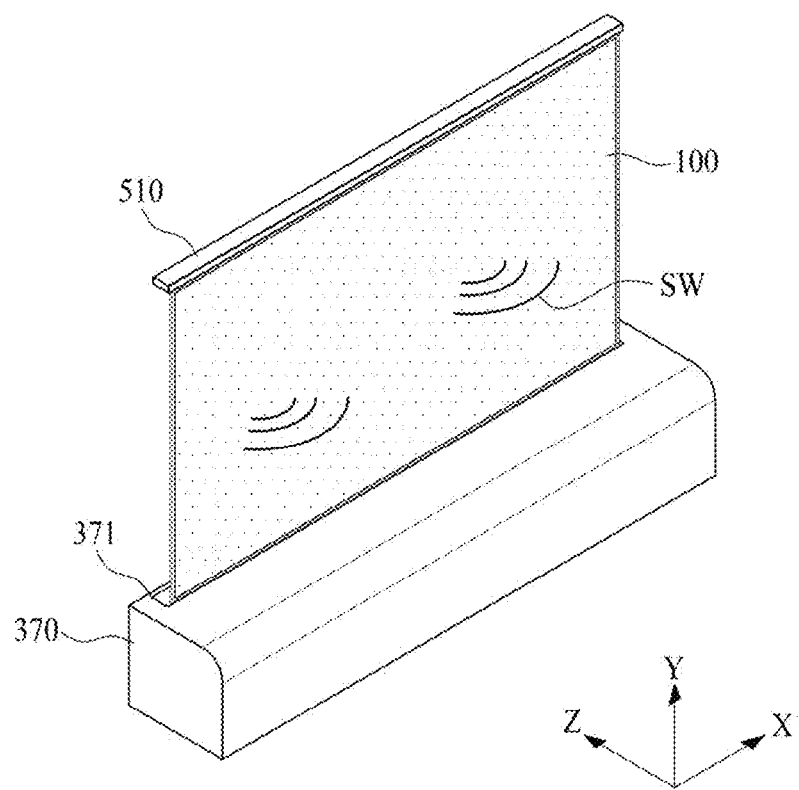
FIG. 12 illustrates a display apparatus according to another example embodiment.
Figure 13:
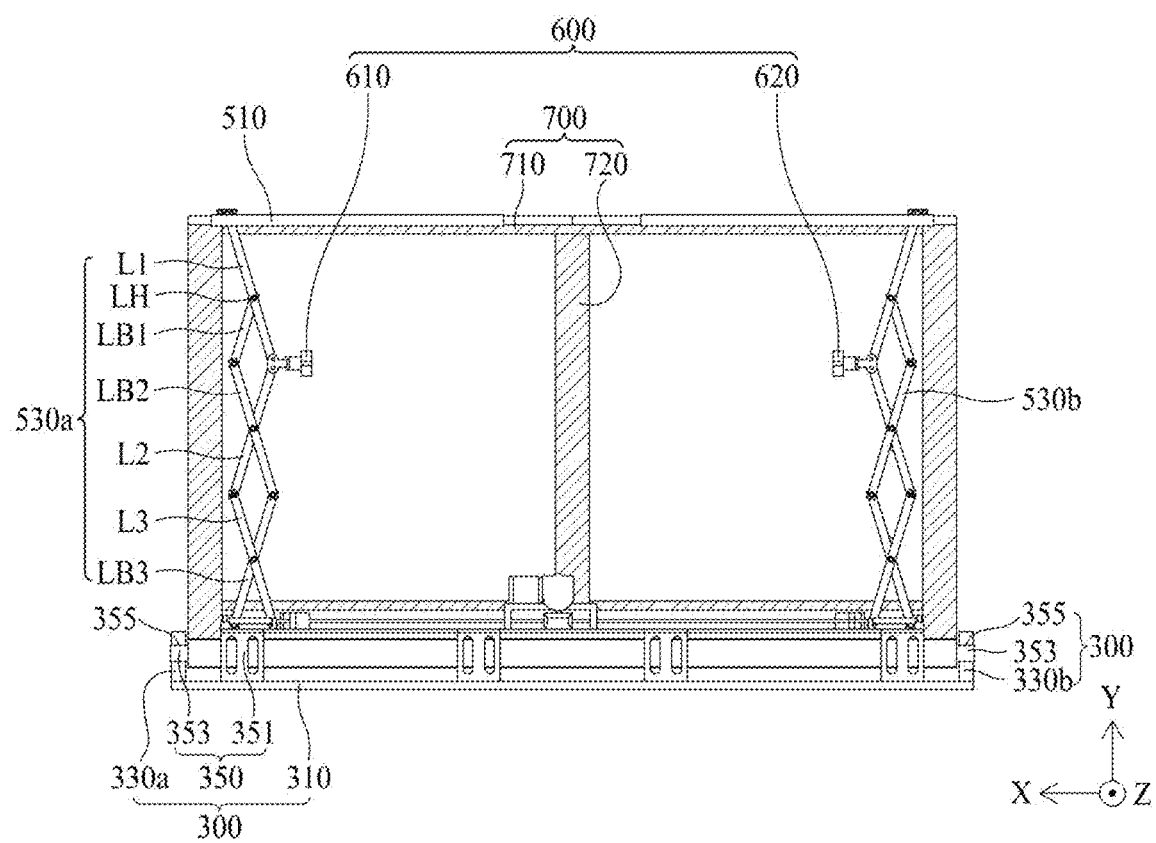
FIG. 13 is a rear perspective view illustrating a display apparatus according to another example embodiment.
Figure 14:
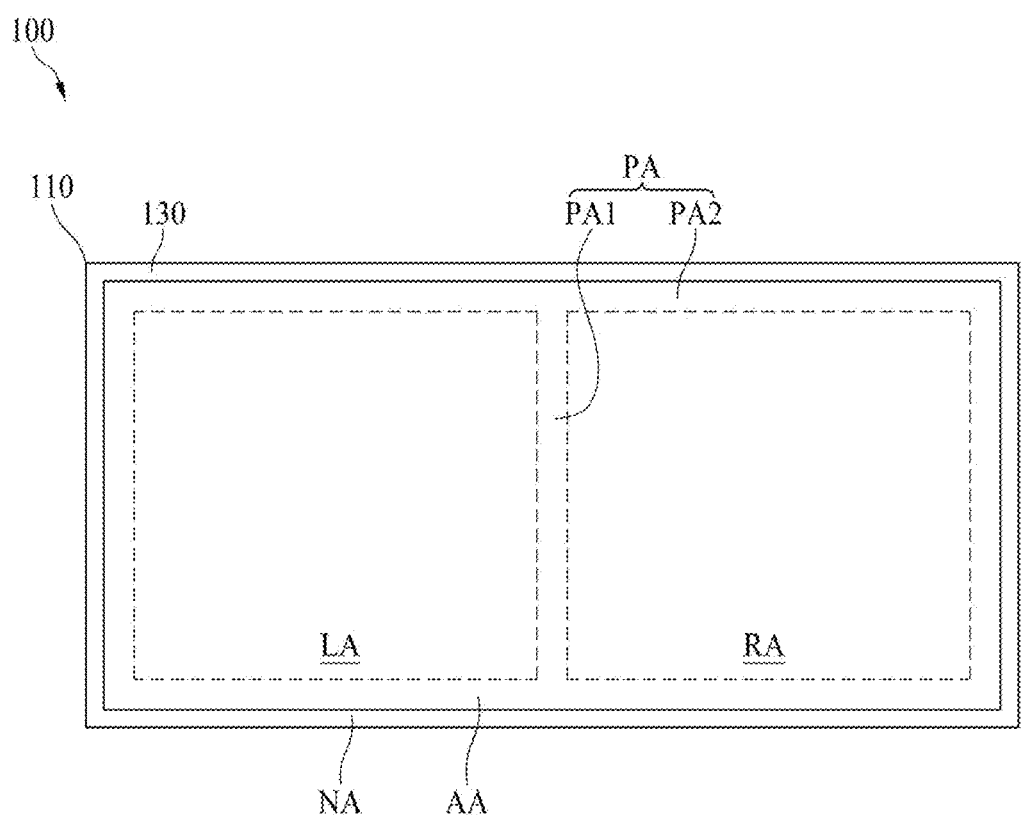
FIG. 14 is a rear perspective view illustrating a partition region in a display apparatus according to another example embodiment.
Figure 15:
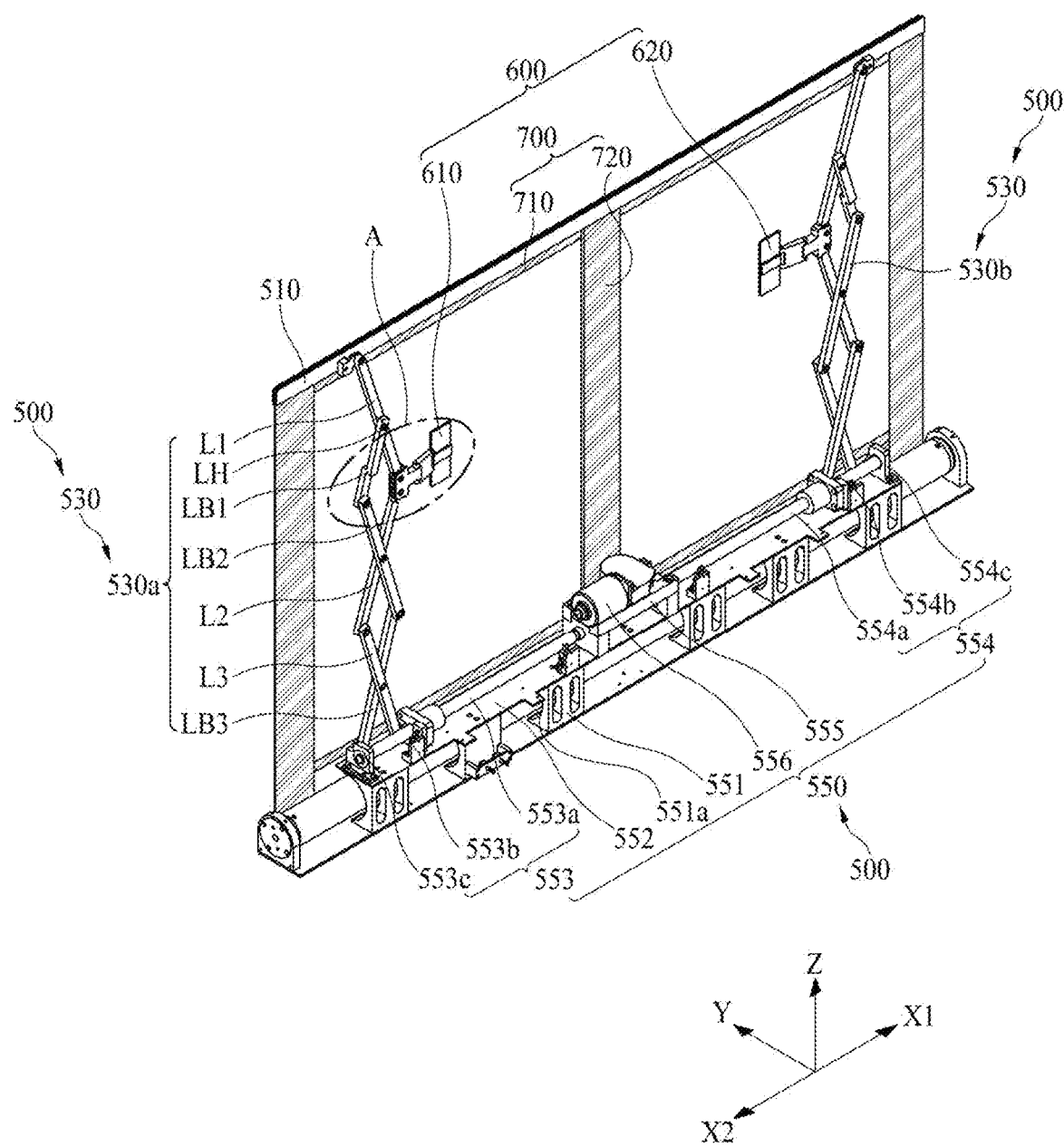
FIG. 15 is a rear perspective view illustrating a state where a structure of a rolling module is unfolded, in a display apparatus according to another example embodiment.
Figure 16:
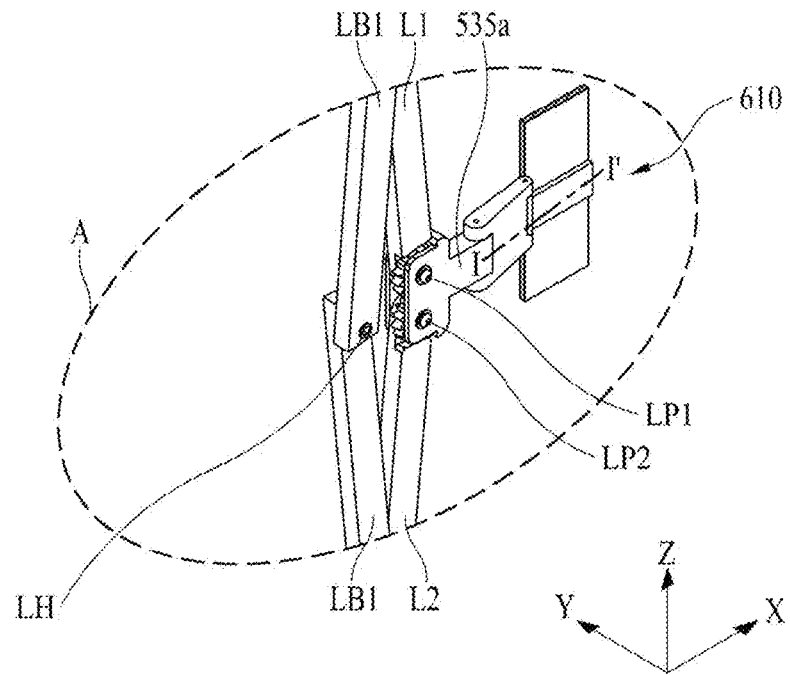
FIG. 16 is an enlarged view of a region 'A' illustrated in FIG. 15.
Figure 17:
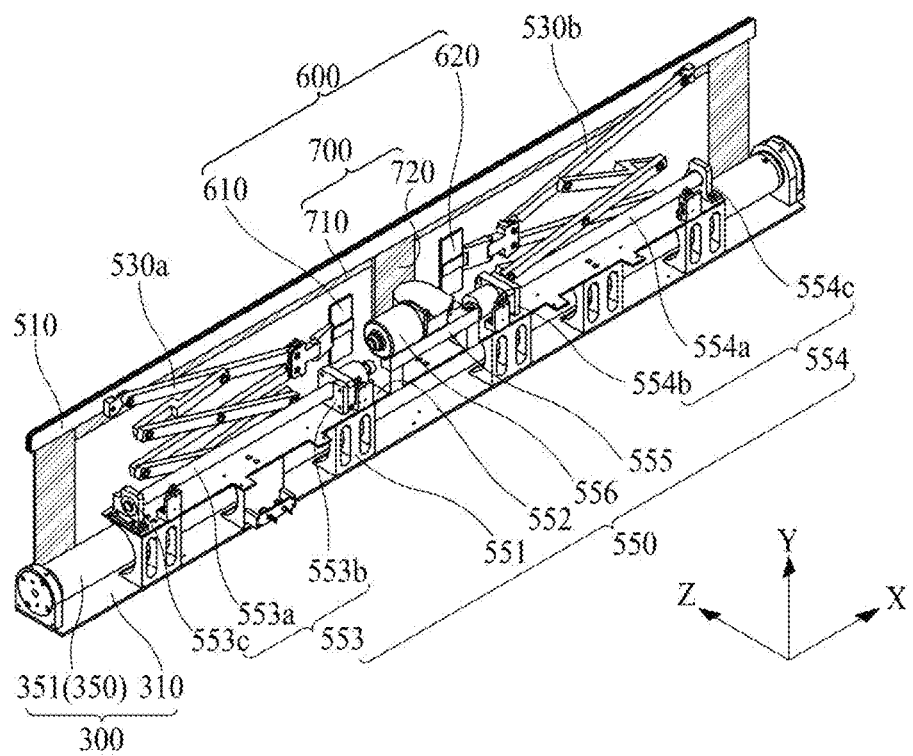
FIG. 17 is a rear perspective view illustrating a state where a structure of a rolling module is folded, in a display apparatus according to another example embodiment.

FIG. 12 is a illustrates a display apparatus according to another example embodiment. FIG. 13 is a rear perspective view illustrating a display apparatus according to another example embodiment. FIG. 14 is a rear perspective view illustrating a partition region in a display apparatus according to another example embodiment. FIG. 15 is a rear perspective view illustrating a state where a structure of a rolling module is unfolded, in a display apparatus according to another example embodiment. FIG. 16 is an enlarged view of a region 'A' illustrated in FIG. 15. FIG. 17 is a rear perspective view illustrating a state where a structure of a rolling module is folded, in a display apparatus according to another example embodiment.

The display apparatus according to another example embodiment described below may not include a plurality of beams 400, and thus, may have a difference with the display apparatus according to an example embodiment illustrated in FIGS. 1 to 11. Therefore, because the display apparatus according to another example embodiment does not include the plurality of beams 400, modified elements will be mainly described below, and the same elements as the above-described elements will be briefly described or are omitted. With reference to FIGS. 12 to 17, the display apparatus according to another example embodiment may include a display panel 100, a panel driver 200, a housing module 300, a rolling module 500, a vibration generating device 600, and a weighting member 700.

The display panel 100 may display an image. When a structure 530 is folded, the display panel 100 may be wound, and when the structure 530 is unfolded, the display panel 100 may be unwound. Here, when a roller 350 rotates normally, the structure 530 may be folded, and when the roller 350 rotates reversely, the structure 530 may be unfolded. Also, the rolling module 500 may be connected to the roller 350 and may normally or reversely rotate the roller 350. According to an example embodiment, the display panel 100 may display an image in an unwound state. Therefore, the rolling module 500 enables the display panel 100 to be easily loaded or unloaded, the rolling module may allow the display panel 100 to be maintained in a flat state. Also, the unfolded display panel 100 may act as a panel speaker (or a vibration plate) that vibrates based on a vibration of the vibration generating device 600 to output the sound SW.

The panel driver 200 may include a plurality of flexible circuit films 210, a data driving IC 220, a PCB 230, a control board 240, a signal cable 250, and a timing controller 260. The panel driver 200 may drive a pixel driving circuit of each of a plurality of pixels in the display panel 100 to allow a self-emitting device to emit light. The housing module 300 may correspond to a body case of the display apparatus. The housing module 300 may support the rolling module 500 and may be connected to a lower portion of the display panel 100. According to an example embodiment, the housing module 300 may include a housing plate 310, a pair of roller brackets 330a and 330b, a roller 350, and a housing cover 370.

The housing plate 310 may be disposed on a bottom portion of the housing module 300 to support the rolling module 500. The pair of roller brackets 330a and 330b may be disposed in both edges or peripheries of the housing plate 310 with respect to a first direction X and may rotatably support the roller 350. The roller 350 may be rotatably between the pair of roller brackets 330a and 330b and may wind or unwind the display panel 100, based on driving of the rolling module 500. The roller 350 according to an example embodiment may include a rolling part 351 that is connected to a lower side of the display panel 100 and a pair of roller shafts 353 that are disposed on both side surfaces of the rolling part 351 and are rotatably disposed in the pair of roller brackets 330a and 330b. Also, the pair of roller shafts 353 may be rotatably disposed in the pair of roller brackets 330a and 330b through bearings 355, respectively.

The housing cover 370 may cover the pair of roller brackets 330a and 330b and the roller 350 each disposed on the housing plate 310, thereby preventing the housing plate 310, the pair of roller brackets 330a and 330b, and the roller 350 from being externally exposed. The housing cover 370 may include a panel entrance 371 through that the display panel 100 moves or loads in or out. As the structure 530 is folded or unfolded based on a normal rotation or a reverse rotation of the roller 350, the display panel 100 may be wound or unwound. The rolling module 500 may include a supporting frame 510, a structure 530, and a driver 550. The supporting frame 510 may be disposed on an upper portion of the display panel 100 and may cover an edge or periphery of the upper portion of the display panel 100, and thus, may cover the panel driver 200 connected to the display panel 100. As the structure 530 is folded or unfolded, the supporting frame 510 may be loaded into the housing module 300 or may be unloaded from the housing module 300. The supporting frame 510 may have a bar shape that covers the periphery of the upper portion of the display panel 100.

The structure 530 may include first and second structures 530a and 530b that are disposed in parallel and are connected between the supporting frame 510 and the driver 550. The first structure 530a may be connected between one portion of the supporting frame 510 and the driver 500 and may be folded or unfolded based on driving of the driver 500, thereby supporting the first sound generating module 610. According to an example embodiment, the first structure 530a may include a plurality of links L1 to Ln connected to the supporting frame 510, a plurality of link bars LB1 to LBn rotatably connected to the plurality of links L1 to Ln by a link hinge LH, and a module connection part 535 connected to at least one of the plurality of links L1 to Ln and supports the first sound generating module 610. Here, the plurality of links may include first to $n^{th}$ links L1 to Ln, and the plurality of link bars may include first to $n^{th}$ link bars LB1 to LBn. Therefore, the first structure 530a may include the first to $n^{th}$ links L1 to Ln and the first to $n^{th}$ link bars LB1 to LBn that are respectively and rotatably connected to the first to $n^{th}$ links L1 to Ln by the link hinge LB. Therefore, the first structure 530a may be folded or unfolded based on a normal rotation or a reverse rotation of the roller 350.

According to an example embodiment, the module connection part 535 may include a joint member 535a that rotatably supports the first link L1 and the second link L2. With reference to FIG. 16, the joint member 535a may rotatably support the first link L1 by using a first link pin LP1 to support the first sound generating module 610. The first link pin LP1 may pass through one portion of the joint member 535a and may rotatably support a second side of the third link L3.

Moreover, the joint member 535a may rotatably support the second link L2 by using a second link pin LP2 to support the first sound generating module 610. The second link pin LP2 may pass through the other portion of the joint member 535a and may rotatably support a first side of the second link L2. Therefore, the second side of the first link L1 and the first side of the second link L2 that are rotatably connected to the joint member 535a may be rotatably connected to each other. The second side of the first link L1 and the first side of the second link L2 may each have a gear structure, and thus, the second side of the first link L1 and the first side of the second link L2 may rotate in engagement with each other. Accordingly, the rotation of the first link L1 may be more stably transferred to the second link L2.

The second structure 530b may be connected between the other portion of the supporting frame 510 and the driver 500 in parallel with the first structure 530a and may be folded or unfolded based on driving of the driver 500, thereby generating the second sound generating module 620. According to an example embodiment, the second structure 530b may include a plurality of links L1 to Ln connected to the supporting frame 510, a plurality of link bars LB1 to LBn that are respectively and rotatably connected to the plurality of links L1 to Ln by a link hinge LB, and a module connection part 535 connected to at least one of the plurality of links L1 to Ln and supports the second sound generating module 620.

Except for that the plurality of links L1 to Ln and the plurality of link bars LB1 to LBn of the second structure 530b are connected between the other portion of the supporting frame 510 and the driver 500. The module connection part 535 of the second structure 530b supports the second sound generating module 620. The plurality of links L1 to Ln, the plurality of link bars LB1 to LBn, and the module connection part 535 of the second structure 530b may be the same as the plurality of links L1 to Ln, the plurality of link bars LB1 to LBn, and the module connection part 535 of the first structure 530a.

The driver 550 may simultaneously fold or unfold the first structure 530a and the second structure 530b in response to a manipulation of a user (a viewer), and thus, may allow the supporting frame 510 connected to the first and second structures 510a and 530b to be loaded into or unloaded from the housing module 300. According to an example embodiment, the driver 550 may include a plurality of fixing members 551, a supporting plate 552, a first driving unit 553, a second driving unit 554, a power transfer unit 555, and a driving motor 556.

The plurality of fixing members 551 may be arranged at certain intervals or distances in the housing plate 310 of the housing module 300. Each of the plurality of fixing members 551 may surround a portion of the rolling part 351 of the housing module 300. The supporting plate 552 may be disposed on the plurality of fixing members 551 and may be disposed on the rolling part 351. The supporting plate 552 may support the first driving unit 553, the second driving unit 554, and the power transfer unit 555. The first driving unit 553 may fold or unfold the first structure 530a, based on power transferred from the power transfer unit 555. The first driving unit 553 according to an example embodiment may include a first ball screw 553a, a first ball catch 553b, and a first link bracket 553c.

The first ball screw 553a may be disposed on the supporting plate 552 and may be rotatably supported by the power transfer unit 555 and the first link bracket 553c. One portion of the first ball screw 553a may be rotatably connected to the power transfer unit 555, and the other portion of the first ball screw 553a may be rotatably supported by the first link bracket 553c. The first ball catch 553b may be movably fastened to the first ball screw 553a and may rotatably support the second side of the $n^{th}$ link bar LBn. The first ball catch 553b may perform a rectilinear motion in the first direction X on the first ball screw 553a based on a rotational motion of the first ball screw 553a to allow the $n^{th}$ link bar LBn to perform a rectilinear motion in the first direction X. The first link bracket 553c may be disposed in a periphery of one portion of the supporting plate 552, may rotatably support the other portion of the first ball screw 553a, and may rotatably support the second side of the $n^{th}$ link Ln included in the first structure 530a.

The second driving unit 554 may fold or unfold the second structure 530b, based on power transferred from the power transfer unit 555. According to an example embodiment, the second driving unit 554 may include a second ball screw 554a, a second ball catch 554b, and a second link bracket 554c. Here, configurations of the second ball screw 554a, the second ball catch 554b, and the second link bracket 554c of the second driving unit 554 may respectively correspond to configurations of the first ball screw 553a, the first ball catch 553b, and the first link bracket 553c of the first driving unit 553, and thus, their repetitive descriptions are omitted.

The power transfer unit 555 may be disposed in the middle portion of the supporting plate 552, may rotatably support one portion of the first ball screw 553a and one portion of the second ball screw 554a, and may transfer a rotational power of the driving motor 556 to the one portion of the first ball screw 553a and the one portion of the second ball screw 554a. The driving motor 556 may be disposed on the power transfer unit 555 and may rotate the rotation gear of the power transfer unit 555 in response to a manipulation of a user (or a viewer).

The vibration generating device 600 may be disposed in the structure 530 of the rolling module 500 and may be unwound from the rolling part 351 of the roller 350 to vibrate the unfolded display panel 100. The display panel 100 may output a sound SW, generated by a vibration of the vibration generating device 600, to a forward region in front of the unfolded display area. The vibration generating device 600 may be rotatably disposed in the module connection part 535 configuring the structure 530 and may directly vibrate the unfolded display panel 100.

According to an example embodiment, the vibration generating device 600 may be disposed in the structure 530, and thus, may be raised or lowered (or moved) along with the folding (or unfolding) of the structure 530. A contact region between the vibration generating device 600 and the display panel 100 may be changed based on an unwinding length (or a loading length) of the display panel 100. The contact region between the vibration generating device 600 and the display panel 100 may be adjusted to a middle region of the unwinding length (or the loading length) of the display panel 100, for a uniform vibration of the display panel 100.

According to an example embodiment, the vibration generating device 600 may include first and second sound generating modules 610 and 620 that vibrate different regions of the display panel 100. The first and second sound generating modules 610 and 620 may be respectively fixed through the first and second structures 530a and 530b. The display panel 100 may include a left region LA and a right region RA, the first sound generating module 610 may overlap the left region LA of the display panel 100, and the second sound generating module 620 may overlap the right region RA of the display panel 100. Therefore, the first sound generating module 610 may vibrate the left region LA of the display panel 100, and the second sound generating module 620 may vibrate the right region RA of the display panel 100. Here, the first and second sound generating modules 610 and 620 may receive different vibration signals and may be independently driven.

The weighting member 700 may be disposed on one surface of the display panel 100 to overlap a partition area PA that surrounds each of the plurality of sound generating modules 610 and 620 spaced apart from the weighting member 700. According to an example embodiment, the weighting member 700 may be as a mass that repeatedly vibrates based on inertia based on a vibration. The weighting member 700 may increase an inertia moment of the display panel 100 that vibrates based on a vibration, transferred thereto, of each of the plurality of sound generating modules 610 and 620. When the display panel 100 vibrates, the weighting member 700 may increase the inertia moment of the display panel 100 to prevent the vibration of the display panel 100 from passing through the partition area PA, thereby preventing interference of a sound output from each of the plurality of sound generating modules 610 and 620.

The partition area PA may include a first partition area PA1 extending in the first direction X and a second partition area PA2 that is connected to the first partition area PA1 and extends in the second direction Y. The first partition area PA1 may include a plurality of first partition areas PA1 that may be disposed in parallel in a widthwise direction (or a long-side lengthwise direction) of the display panel 100. The second partition area PA2 may include plurality and the plurality of second partition areas PA2 that may be disposed in parallel in a lengthwise direction (or a short-side lengthwise direction) of the display panel 100.

The weighting member 700 may include first and second weighting members 710 and 720. The first weighting member 710 may be disposed on one surface of the display panel 100 to overlap the first partition area PA1. The first weighting member 710 may be disposed to overlap each of an upper portion and a lower portion of the display panel 100 and may increase an inertia moment of an edge or periphery of each of the upper portion and the lower portion of the display panel 100. Therefore, the first weighting member 710 may prevent a vibration generated by each of the first and second sound generating modules 610 and 620 from passing through the first partition area PA1. In other words, the first weighting member 710 may prevent the vibration generated by each of the first and second sound generating modules 610 and 620 from being attenuated through the edge or periphery of each of the upper portion and the lower portion of the display panel 100.

The second weighting member 720 may be on one surface of the display panel 100 to overlap the second partition area PA2. Also, the second weighting member 720 may be provided in plurality, and the plurality of second weighting members 720 may be arranged in the second direction Y so as to be wound along with the display panel 100. The second weighting member 720 may be disposed to overlap each of a left portion, a center vertical axis, and a right portion of the display panel 100 and may increase an inertia moment of an edge or periphery of each of the left portion, the center vertical axis, and the right portion of the display panel 100. Also, the plurality of second weighting members 720 may be arranged in the second direction Y in a state that is not coupled or connected to one another. Therefore, even in a case where the second weighting member 720 includes a material having high stiffness, the second weighting member 720 may be wound along with the display panel 100 when the display panel 100 is wound.

According to an example embodiment, the second weighting members 720 may be spaced apart from one another by a certain distance in the second direction Y, or may contact one another so that a distance between adjacent second weighting members 720 is zero. As a distance between the second weighting members 720 spaced apart from each other in the second direction Y is reduced, the second weighting members 720 may increase an inertia moment of the display panel 100. Even in a case where adjacent second weighting members 720 contact each other because a distance between adjacent second weighting members 720 is zero, the second weighting members 720 may be wound along with the display panel 100 when the display panel 100 is wound.

In a case where the display apparatus according to an example embodiment is provided as one body and includes a weighting member extending in the second direction Y, the weighting member may have a problem that is not wound along with the display panel. However, the display apparatus according to an example embodiment may include the plurality of beams 400 arranged in the second direction Y, and thus, even in a case where the display apparatus includes a material having high stiffness, the plurality of beams 400 may be wound along with the display panel 100 when the display panel 100 is wound.

The second weighting member 720 may prevent a vibration generated by each of the first and second sound generating modules 610 and 620 from passing through the second partition region PA2. In other words, the second weighting member 720 may prevent interference between the vibrations generated by the first and second sound generating modules 610 and 620 and may prevent the vibrations from being attenuated through the edge or periphery of each of the left portion and the right portion of the display panel 100. According to an example embodiment, the weighting member 700 may be formed of a material that has a greater density than the display panel 100. The weighting member 700 may include a material such as iron (Fe), copper (Cu), nickel (Ni), gold (Au), silver (Ag), and/or titanium (Ti), which has a greater density than other materials.

Figure 18:
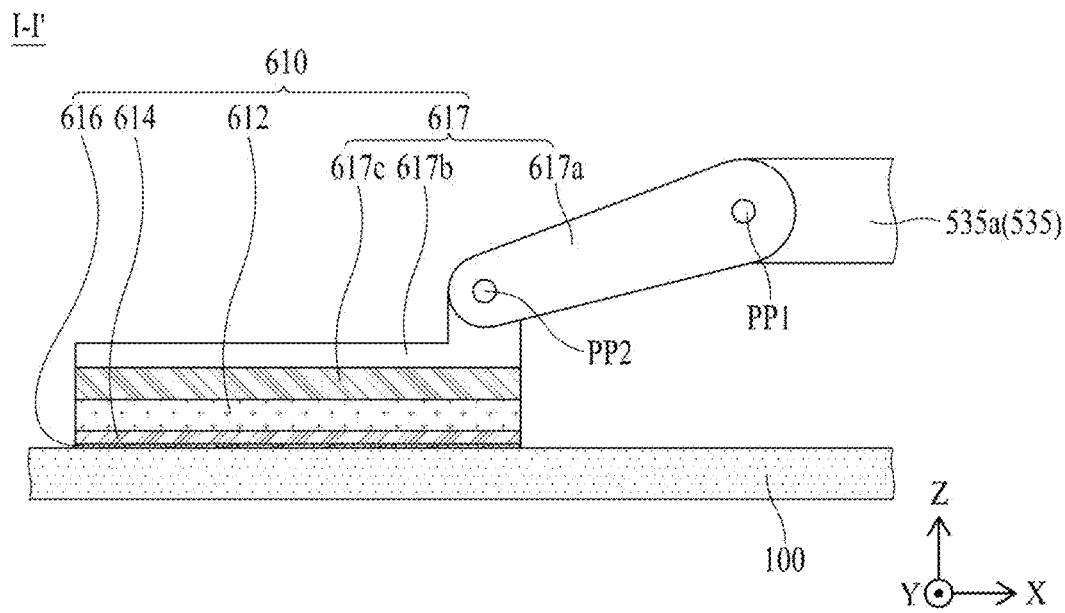
FIG. 18 is a cross-sectional view taken along line I-I' of FIG. 16.

FIG. 18 is a cross-sectional view taken along line I-I' of FIG. 16. With reference to FIG. 18, a sound generating module 610 may be disposed in structures 530*a* and 530*b* of a rolling module 500 and may vibrate an unfolded display panel 100. The sound generating module 610 may include a vibration generating device 612, a magnetic force member 614, and a module supporting member 617. The vibration generating device 612 may be coupled or connected to a front surface of a supporting bracket 617*c* of the module supporting member 617 facing a rear surface of the display panel 100 using an adhesive member. The vibration generating device 612 may contact the rear surface of the display panel 100 and may vibrate the display panel 100, based on a sound signal (or a voice signal) provided from a sound driving circuit.

According to an example embodiment, the vibration generating device 612 may include a piezoelectric material layer having a piezoelectric effect, a first electrode disposed on a front surface of the piezoelectric material layer, and a second electrode disposed on a rear surface of the piezoelectric material layer. The vibration generating device 612 may include the piezoelectric material layer, and thus, may be referred to as a piezoelectric device. Therefore, the vibration generating device 612 may contact the rear surface of the display panel 100 and may repeatedly expand and contract based on an inverse piezoelectric effect or a piezoelectric effect of a piezoelectric material according to the sound signal provided from the sound driving circuit, thereby vibrating the display panel 100.

The magnetic force member 614 may rotate by first and second rotation links 617*a* and 617*b* and may be disposed on the rear surface of the display panel 100. Therefore, when the display panel 100 is unwound and unfolded, the magnetic force member 614 may be attached on the display panel 100 by a magnetic force. Therefore, the vibration generating device 612 may contact the display panel 100 by using the magnetic force member 614 and may vibrate based on a sound signal to vibrate the display panel 100. The display panel 100 may vibrate based on a vibration transferred through the magnetic force member 614 from the vibration generating device 612 to generate sound, and the sound may be output to a forward region in front of the display panel 100. The first and second rotation links 617*a* and 617*b* may rotate based on a magnetic force by which the magnetic force member 614 is attracted to the display panel 100, and thus, may allow the magnetic force member 614 to be attached on the display panel 100.

According to an example embodiment, the sound generating module 610 may further include a coating layer 616. The coating layer 616 may be disposed on a front surface (or a panel contact surface) of the magnetic force member 614 directly contacting the rear surface of the display panel 10 to decrease a frictional force between the magnetic force member 614 and the rear surface of the display panel 100 that is unfolded. When the display panel 100 is unwound by a certain length, the magnetic force member 614 may be attached on the rear surface of the display panel 100 that is unfolded, and the display panel 100 may be more unfolded with the magnetic force member 614 being attached thereon. Also, when the frictional force between the magnetic force member 614 and the rear surface of the display panel 100 is high, a scratch may occur in the rear surface of the display panel 100 or noise may occur. In order to solve such a problem, the coating layer 616 may include a material having a relatively low friction coefficient and may be provided on a front surface of the magnetic force member 614, thereby decreasing the frictional force between the magnetic force member 614 and the rear surface of the display panel 100 that is unfolded.

The module supporting member 617 may be rotatably disposed in the first structure 530*a* of the rolling module 500 to rotatably support the vibration generating device 612, thereby allowing the vibration generating device 612 to contact the rear surface of the display panel that is unfolded. Also, when the module supporting member 617 is fixedly disposed in the first structure 530*a* so as not to rotate, the display panel 100 may be wound or unwound in a state of physically contacting the vibration generating module 610, and due to this, the display panel 100 and/or the vibration generating module 610 may be damaged. Therefore, when the module supporting member 617 is rotatably disposed in the first structure 530*a*, the vibration generating module 610 may rotate based on a flatness of the display panel 100 that is wound or unwound. According to an example embodiment, the module supporting member 617 may include a first rotation link 617*a*, a second rotation link 617*b*, and a supporting bracket 617*c*.

The first rotation link 617*a* may be disposed in the joint member 535*a* of the first structure 530*a* so as to rotate in a third direction Z by using a first pivot pin PP1. Here, the third direction Z may be a thickness direction of the display panel 100. The first rotation link 617*a* may include a pair of first sidewalls that protrude in parallel from both edges or peripheries of a first side of the first rotation link 617*a*. The first pivot pin PP1 may be inserted or accommodated into one of the pair of first sidewalls provided in the first rotation link 617a and may be inserted or accommodated into the other sidewall of the pair of first sidewalls through the joint member 535a of the first structure 530a, thereby rotatably supporting the first rotation link 617a. Accordingly, the first rotation link 617a may be rotatably connected to the joint member 535a of the first structure 530a by the first pivot pin PP1. According to an example embodiment, the joint member 535a of the first structure 530a may include a protrusion that protrudes toward one side surface of the display panel 100, and the protrusion may be inserted or accommodated between the pair of first sidewalls provided in the first rotation link 617a.

The second rotation link 617b may be disposed on a second side of the first rotation link 617a so as to rotate in the second direction Y using a second pivot pin PP2. The first rotation link 617a and the second rotation link 617b may each have a two-link structure that has fluidity in a rearward direction with respect to the display panel 100, and thus, may maintain the flatness of the display panel 100, thereby enhancing adhesiveness between the vibration generating device 612 and the display panel 100. The supporting bracket 617c may be coupled or connected to a rear surface of the second rotation link 714 facing the rear surface of the display panel 100 and may support the vibration generating device 612. The supporting bracket 617c may have a size that is relatively wide with respect to the second rotation link 617b, and may have the same size as that of the vibration generating device 612.

Figure 19:
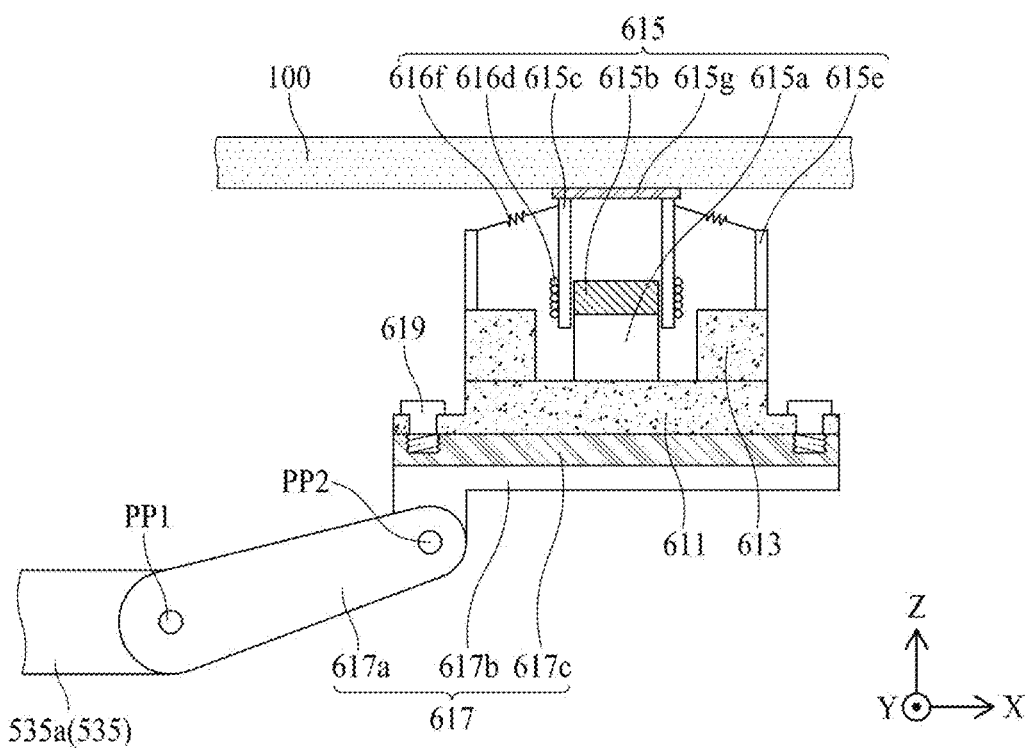
FIG. 19 is another cross-sectional view taken along line I-I' of FIG. 16.

FIG. 19 is another cross-sectional view taken along line I-I' of FIG. 16. With reference to FIG. 19, the sound generating module 610 may include a module frame 611, a side frame 613, and a vibration unit 615. The module frame 611 may be supported by the module supporting member 617 and may support the sound generating module 610. The module frame 611 may support the side frame 613 and the magnet member 615a. The module frame 611 may be as a lower plate that is disposed under the magnet member 615a. Therefore, the sound generating module 610 may not include a separate lower plate, and the upper plate 615b and the module frame 611 may be disposed on and under the magnet member 615a and may increase a magnetic flux density generated through the magnet member 615a.

The side frame 613 may be disposed on the module frame 611, and may surround a lower portion of the vibration unit 615 spaced apart from the side frame 613. The side frame 613 may surround the magnet member 615a spaced apart from the side frame 613, and thus, may allow a magnetic flux generated by the magnet member 615a from concentrating on the inside of the vibration unit 615, thereby preventing leakage of the magnetic flux. The vibration unit 615 may be disposed on the module frame 611 to vibrate the display panel 100. The vibration unit 615 may include the magnet member 615a, the upper plate 615b, a bobbin 615c, a coil 615d, an external frame 615e, a damper 615f, and a bobbin ring 615g.

The magnet member 615a may be disposed on the module frame 611. The magnet member 615a may be disposed between the upper plate 615b and the module frame 611 and may be surrounded by the side frame 603 spaced apart from the magnet member 615a. The upper plate 615b may be disposed in an upper portion of the magnet member 615a and may be spaced apart from the display panel 100. Also, the magnet member 615a and the upper plate 615b may be inserted or accommodated into the bobbin 615c having a cylindrical shape, and thus, an outer circumference surface of each of the magnet member 615a and the upper plate 615b may be surrounded by the bobbin 615c.

The bobbin 615c may be surround the upper plate 615b and may be disposed on the rear surface of the display panel 100 through the bobbin ring 615g. The bobbin 615c may surround the magnet member 615a and the upper plate 615b and may be surrounded by the side frame 613 spaced apart from the bobbin 615c. The coil 615d may be wound around the outer circumference surface of the bobbin 615c and may be surrounded by the magnet member 615a spaced apart from the coil 615d. The coil 615d may be wound around the outer circumference surface of the bobbin 615c, may surround the magnet member 615a spaced apart from the coil 615d, and may be supplied with a sound-generating current.

The external frame 615e may be disposed on the side frame 613. The external frame 615e may extend from an outer portion of an upper portion of the side frame 613 to the display panel 100. The damper 615f may be disposed between the external frame 615e and the bobbin 615c and may guide the vibration of the bobbin 615c. The one portion of the damper 615f may be connected to an upper portion of the external frame 615e, and the other portion of the damper 615f may be connected to the bobbin 615c. The bobbin ring 615g may be disposed between the bobbin 615c and the display panel 100 and may transfer the vibration of the bobbin 615c to the display panel 100. Also, the bobbin ring 615g may attach the bobbin 615c on a rear surface of the display panel 100. The sound generating module 610 may be coupled or connected to the supporting bracket 617c by a fastening member 619. The fastening member 619 may pass through the module frame 611 and may be fastened to the supporting bracket 617c, thereby fixing the module frame 611 to the supporting bracket 617c.

A display apparatus according to an embodiment of the present disclosure may be applied to a flexible display apparatus. For example, the display apparatus according to an embodiment of the present disclosure may be applied to a rollable display apparatus.

A display apparatus according to an embodiment of the present disclosure will be described below.

A display apparatus according to an embodiment of the present disclosure includes a display panel configured to display an image, a housing module including a roller configured to have the display panel wound or unwound in the housing module, a rolling module including a structure connected to an upper portion of the display panel, and configured to wind or unwind the display panel according to a folding or unfolding of the structure, a plurality of beams on one surface of display panel to extend in a first direction. and arranged in a second direction vertical to the first direction, and a vibration generating device in a portion of each of the plurality of beams, the vibration generating device including a plurality of sound generating modules configured to vibrate the display panel when the display panel is unwound from the roller and the structure is unfolded.

According to some embodiments of the present disclosure, each of the plurality of beams may include a plurality of first beams that extends rectilinearly in the first direction, supports the display panel and a second beam including a panel supporting part that supports the display panel, and an accommodating part between adjacent panel supporting parts that support each of the plurality of sound generating modules.

According to some embodiments of the present disclosure, the panel supporting part and the plurality of first beams may include a plurality of supporting parts attached to one surface of the display panel, and protruding from the one surface of the display panel, and a connection part connecting the plurality of supporting parts.

According to some embodiments of the present disclosure, the display apparatus may further include a weighting member between the plurality of beams and the display panel that overlaps a partition region surrounding each of the plurality of sound generating modules spaced apart from the weighting member.

According to some embodiments of the present disclosure, the weighting member may be in the plurality of beams and the panel supporting part.

According to some embodiments of the present disclosure, the partition region may include a first partition region extending in the first direction and a second partition region connected to the first partition region and extended in the second direction, and the weighting member may include a first weighting member in a portion of each of the plurality of first beams, and overlapping the first partition region and a second weighting member in at least a portion of each of the plurality of first beams and the panel supporting part, overlapping the second partition region and spaced apart from the second weighting member in the second direction.

According to some embodiments of the present disclosure, the weighting member may include a material with a higher density than the display panel.

According to some embodiments of the present disclosure, each of the plurality of sound generating modules may include a module frame connected to the accommodating part of the second beam, a vibration unit on the module frame configured to vibrate the display panel, and a side frame on the module frame surrounding a lower portion of the vibration unit spaced apart from the side frame.

According to some embodiments of the present disclosure, the vibration unit may include a magnet member supported by the module frame and surrounded by the side frame, an upper plate on the magnet member, a bobbin surrounding the upper plate, a coil wound around an outer surface of the bobbin, and surrounding the magnet member that is spaced apart from the coil, and a bobbin ring between the bobbin and the display panel configured to transfer a vibration of the bobbin to the display panel.

According to some embodiments of the present disclosure, the vibration unit may further include an external frame on the side frame and a damper between the external frame and the bobbin, and configured to guide vibration of the bobbin.

According to some embodiments of the present disclosure, the rolling module may further include a supporting frame that supports the upper portion of the display panel and a driver in the housing module configured to rotate the roller, and the structure may be between the supporting frame and the driver and may be folded or unfolded based on the rotation of the roller.

According to some embodiments of the present disclosure, the structure may include a first structure and a second structure in parallel between the supporting frame and the driver, and each of the first structure and the second structure may include a link connected to the supporting frame and a link bar rotatably connected to the link by a link hinge.

According to some embodiments of the present disclosure, the structure may be spaced apart from each of the plurality of sound generating modules based on the structure being folded or unfolded.

According to some embodiments of the present disclosure, the driver may include a plurality of fixing members arranged at certain intervals in the housing module, a supporting plate on the plurality of fixing members, and a first driving unit folding or unfolding the first structure and a second driving unit folding or unfolding the second structure.

According to some embodiments of the present disclosure, the first driving unit may include a first ball screw on the supporting plate, a first ball catch movably fastened to the first ball screw, and a first link bracket rotatably supporting the first ball screw, the second driving unit may include a second ball screw on the supporting plate, a second ball catch movably fastened to the second ball screw, and a second link bracket rotatably supporting the second ball screw.

According to some embodiments of the present disclosure, the display panel may include a roller connection part connecting a lower portion of the display panel to a rolling part of the roller.

According to some embodiments of the present disclosure, the housing module may further include a housing plate on a bottom portion of the housing module to support the rolling module, a pair of roller brackets in both peripheries of the housing plate with respect to the first direction to rotatably support the roller, and a housing cover covering the pair of roller brackets and the roller.

A display apparatus according to an embodiment of the present disclosure includes a display panel configured to display an image, a housing module including a roller configured to have the display panel wound or unwound in the housing module, a rolling module including a structure connected to an upper portion of the display panel, and configured to wind or unwind the display panel according to a folding or unfolding of the structure, a vibration generating device in the structure that includes a plurality of sound generating modules configured to vibrate the display panel when the display panel is unwound from the roller and the structure is unfolded, and a weighting member on one surface of the display panel that overlaps a partition region surrounding each of the plurality of sound generating modules spaced apart from the weighting member.

According to some embodiments of the present disclosure, the partition region may include a first partition region extending in the first direction and a second partition region connected to the first partition region and extended in the second direction, the weighting member may include a first weighting member on one surface of the display panel overlapping the first partition region and a second weighting member on the one surface of the display panel overlapping the second partition region, and the second weighting member may include a plurality of second weighting members arranged in the second direction.

According to some embodiments of the present disclosure, the weighting member may include a material with a higher density than the display panel.

According to some embodiments of the present disclosure, the rolling module may further include a supporting frame that supports the upper portion of the display panel and a driver in the housing module to rotate the roller, and the structure may be connected between the supporting frame and the driver, and may be folded or unfolded based on the rotation of the roller.

According to some embodiments of the present disclosure, the structure may include a first structure and a second structure in parallel between the supporting frame and the driver, and each of the first structure and the second structure may include a link connected to the supporting frame, a link bar rotatably connected to the link by a link hinge, and a module connection part connecting the link to each of the plurality of sound generating modules.

According to some embodiments of the present disclosure, each of the plurality of sound generating modules may include a module supporting member rotatably connected to the module connection part, a module frame on the module supporting member, a vibration unit on the module frame configured to vibrate the display panel, and a side frame on the module frame surrounding a lower portion of the vibration unit, spaced apart from the side frame.

According to some embodiments of the present disclosure, the vibration unit may include a magnet member supported by the module frame and surrounded by the side frame, an upper plate on the magnet member, a bobbin surrounding the upper plate, a coil wound around an outer surface of the bobbin, and surrounding the magnet member that is spaced apart from the coil, and a bobbin ring between the bobbin and the display panel configured to transfer a vibration of the bobbin to the display panel.

According to some embodiments of the present disclosure, each of the plurality of sound generating modules may include a module supporting member rotatably connected to the module connection part and a vibration generating device that includes a piezoelectric device with a piezoelectric material layer.

According to some embodiments of the present disclosure, each of the plurality of sound generating modules may be spaced apart from the display panel when the display panel is wound or unwound, and each of the plurality of sound generating modules may contact the display panel when unwinding of the display panel ends.

According to some embodiments of the present disclosure, the display panel may include a roller connection part connecting a lower portion of the display panel to a rolling part of the roller.

According to some embodiments of the present disclosure, the housing module may further include a housing plate on a bottom portion of the housing module to support the rolling module, pair of roller brackets in both peripheries of the housing plate with respect to the first direction to rotatably support the roller, and a housing cover covering the pair of roller brackets and the roller.

According to some embodiments of the present disclosure, the module connection part may include a joint member that rotatably supports the link using link pins.

According to some embodiments of the present disclosure, the driver may include a plurality of fixing members arranged at certain intervals in the housing module, a supporting plate on the plurality of fixing members, and a first driving unit folding or unfolding the first structure and a second driving unit folding or unfolding the second structure.

According to some embodiments of the present disclosure, the first driving unit may include may include a first ball screw on the supporting plate, a first ball catch movably fastened to the first ball screw, and a first link bracket rotatably supporting the first ball screw, the second driving unit may include a second ball screw on the supporting plate, a second ball catch movably fastened to the second ball screw, and a second link bracket rotatably supporting the second ball screw.

According to some embodiments of the present disclosure, each of the plurality of sound generating modules may further includes a magnetic force member on a rear surface of the display panel and a coating layer on a front surface of the magnetic force member contacting the rear surface of the display panel.

According to some embodiments of the present disclosure, the module supporting member may include a first rotation link including a pair of first sidewalls protruding in parallel from both edges or peripheries of a first side of the first rotation link, a second rotation link on a second side of the first rotation link, and a supporting bracket connected to a rear surface of the second rotation link facing the rear surface of the display panel.

According to some embodiments of the present disclosure, the vibration unit may further include an external frame on the side frame, and a damper between the external frame and the bobbin, and configured to guide vibration of the bobbin.

A display apparatus according to an embodiment of the present disclosure may allow an image generating position of an image displayed thereby to match a sound generating position of a sound generated thereby, and thus, may enhance the three-dimensionality of the sound, thereby enhancing an immersion experience of a viewer watching the image.

Moreover, a display apparatus according to an embodiment of the present disclosure may include a plurality of beams on one surface of the display panel, and thus, may supports the wound or unwound display panel without needing a separate rear structure.

Moreover, a display apparatus according to an embodiment of the present disclosure may include a weighting member between each of the plurality of beams and the display panel, and thus, may prevent interference between sounds generated by the plurality of sound generating modules.

The above-described features, structure, and effect of the present disclosure are included in at least one example embodiment, but are not limited to only one example embodiment. Furthermore, the features, structure, and effect described in at least one example embodiment may be implemented through combination or modification of other example embodiments by those skilled in the art. Therefore, content associated with the combination and modification should be construed as being within the scope of the present disclosure. It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus, comprising:
   a display panel configured to display an image;
   a housing module including a roller configured to have the display panel wound or unwound in the housing module;
   a rolling module including a structure connected to an upper portion of the display panel, and configured to wind or unwind the display panel according to a folding or unfolding of the structure;
   a vibration generating device in the structure that includes a plurality of sound generating modules configured to vibrate the display panel when the display panel is unwound from the roller and the structure is unfolded; and
   a weighting member on one surface of the display panel that overlaps a partition region surrounding each of the plurality of sound generating modules spaced apart from the weighting member.

2. The display apparatus of claim 1, wherein:
the partition region includes:
a first partition region extending in the first direction; and
a second partition region connected to the first partition region and extended in the second direction, and
the weighting member includes:
a first weighting member on one surface of the display panel overlapping the first partition region; and
a second weighting member on the one surface of the display panel overlapping the second partition region, and
the second weighting member includes a plurality of second weighting members arranged in the second direction.

3. The display apparatus of claim 1, wherein the weighting member includes a material with a higher density than the display panel.

4. The display apparatus of claim 1, wherein:
the rolling module further includes:
a supporting frame that supports the upper portion of the display panel; and
a driver in the housing module configured to rotate the roller,
wherein the structure is between the supporting frame and the driver, and is folded or unfolded based on the rotation of the roller.

5. The display apparatus of claim 4, wherein:
the structure includes a first structure and a second structure in parallel between the supporting frame and the driver;
each of the first structure and the second structure includes:
a link connected to the supporting frame; and
a link bar rotatably connected to the link by a link hinge; and
a module connection part connecting the link to each of the plurality of sound generating modules.

6. The display apparatus of claim 5, wherein each of the plurality of sound generating modules includes:
a module supporting member rotatably connected to the module connection part;
a module frame on the module supporting member;
a vibration unit on the module frame configured to vibrate the display panel; and
a side frame on the module frame surrounding a lower portion of the vibration unit, spaced apart from the side frame.

7. The display apparatus of claim 6, wherein the vibration unit includes:
a magnet member supported by the module frame and surrounded by the side frame;
an upper plate on the magnet member;
a bobbin surrounding the upper plate;
a coil wound around an outer surface of the bobbin, and surrounding the magnet member that is spaced apart from the coil; and
a bobbin ring between the bobbin and the display panel configured to transfer a vibration of the bobbin to the display panel.

8. The display apparatus of claim 7, wherein the vibration unit further includes:
an external frame on the side frame; and
a damper between the external frame and the bobbin, and configured to guide vibration of the bobbin.

9. The display apparatus of claim 8, wherein each of the plurality of sound generating modules further includes:

a magnetic force member on a rear surface of the display panel; and
a coating layer on a front surface of the magnetic force member contacting the rear surface of the display panel.

10. The display apparatus of claim 8, wherein the module supporting member includes:
a first rotation link including a pair of first sidewalls protruding in parallel from both peripheries of a first side of the first rotation link;
a second rotation link disposed on a second side of the first rotation link; and
a supporting bracket connected to a rear surface of the second rotation link facing the rear surface of the display panel.

11. The display apparatus of claim 6, wherein the module supporting member includes:
a first rotation link including a pair of first sidewalls protruding in parallel from both edges or peripheries of a first side of the first rotation link;
a second rotation link on a second side of the first rotation link; and
a supporting bracket connected to a rear surface of the second rotation link facing the rear surface of the display panel.

12. The display apparatus of claim 5, wherein each of the plurality of sound generating modules includes:
a module supporting member rotatably connected to the module connection part; and
a vibration generating device that includes a piezoelectric device with a piezoelectric material layer.

13. The display apparatus of claim 12, wherein:
the first driving unit includes:
a first ball screw on the supporting plate;
a first ball catch movably fastened to the first ball screw; and
a first link bracket rotatably supporting the first ball screw, and
the second driving unit includes:
a second ball screw on the supporting plate;
a second ball catch movably fastened to the second ball screw; and
a second link bracket rotatably supporting the second ball screw.

14. The display apparatus of claim 5, wherein the module connection part includes a joint member that rotatably supports the link using link pins.

15. The display apparatus of claim 4, wherein the driver includes:
a plurality of fixing members arranged at certain intervals in the housing module;
a supporting plate on the plurality of fixing members; and
a first driving unit folding or unfolding the first structure and a second driving unit folding or unfolding the second structure.

16. The display apparatus of claim 1, wherein:
each of the plurality of sound generating modules is spaced apart from the display panel when the display panel is wound or unwound, and
each of the plurality of sound generating modules contacts the display panel when the unwinding of the display panel ends.

17. The display apparatus of claim 1, wherein the display panel includes a roller connection part connecting a lower portion of the display panel to a rolling part of the roller.

18. The display apparatus of claim 1, wherein the housing module further includes:

a housing plate on a bottom portion of the housing module to support the rolling module; and a pair of roller brackets in both peripheries of the housing plate with respect to the first direction to rotatably support the roller.

\* \* \* \* \*